United States Patent
Fukuya et al.

(10) Patent No.: US 9,025,044 B2
(45) Date of Patent: May 5, 2015

(54) IMAGING DEVICE, DISPLAY METHOD, AND COMPUTER-READABLE RECORDING MEDIUM

(75) Inventors: Yoshiyuki Fukuya, Sagamihara (JP); Kensei Ito, Sagamihara (JP); Hideaki Matsuoto, Fuchu (JP); Yuji Miyauchi, Machida (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/482,653

(22) Filed: May 29, 2012

(65) Prior Publication Data

US 2012/0307101 A1  Dec. 6, 2012

(30) Foreign Application Priority Data

May 30, 2011 (JP) .................. 2011-120796

(51) Int. Cl.
*H04N 5/228* (2006.01)
*G06K 9/36* (2006.01)
*G06K 9/00* (2006.01)
*G09G 5/00* (2006.01)
*H04M 1/00* (2006.01)
*H04N 5/232* (2006.01)
*H04N 5/272* (2006.01)

(52) U.S. Cl.
CPC ....... *H04N 5/23216* (2013.01); *H04N 5/23219* (2013.01); *H04N 5/23293* (2013.01); *H04N 5/272* (2013.01)

(58) Field of Classification Search
USPC ................... 382/118; 348/333.12, 240.4, 169
See application file for complete search history.

(56) References Cited

U.S. PATENT DOCUMENTS

| | | | |
|---|---|---|---|
| 2002/0114534 A1* | 8/2002 | Nakamura et al. | 382/276 |
| 2004/0165085 A1* | 8/2004 | Shibutani | 348/231.3 |
| 2005/0046730 A1* | 3/2005 | Li | 348/333.12 |
| 2008/0152199 A1* | 6/2008 | Oijer | 382/118 |
| 2010/0141784 A1* | 6/2010 | Yoo | 348/222.1 |
| 2010/0149210 A1* | 6/2010 | Matsunaga et al. | 345/625 |

FOREIGN PATENT DOCUMENTS

JP     2004-147046     5/2004

* cited by examiner

*Primary Examiner* — Roberto Velez
*Assistant Examiner* — Stephen Coleman
(74) *Attorney, Agent, or Firm* — John C. Pokotylo; Straub & Pokotylo

(57) ABSTRACT

An imaging device includes an imaging unit that images a subject and that continuously creates image data on the subject; a display unit that chronologically displays live view images associated with the image data created by the imaging unit; a face detector that detects the face of a subject included in the live view image; a trimming unit that creates a face image by cutting out, from the live view images, a face area including the face of the subject detected by the face detector; and a display controller that displays the face image created by the trimming unit at a display position specified in a display area of the display unit.

19 Claims, 26 Drawing Sheets

SHIFTED TO RIGHT

IMAGING DEVICE, DISPLAY METHOD, AND COMPUTER-READABLE RECORDING MEDIUM

CROSS-REFERENCE TO RELATED APPLICATION

This application is based upon and claims the benefit of priority from Japanese Patent Application No. 2011-120796, filed on May 30, 2011, the entire contents of which are incorporated herein by reference.

BACKGROUND OF THE INVENTION

1. Field of the Invention

The present invention relates to an imaging device that images a subject and creates electronic image data and a display method and a program for the same.

2. Description of the Related Art

In recent years, imaging devices, such as digital cameras, that have two imaging units have been known. For example, there is a known technology with which an image can be captured with the first imaging unit from the front side that faces a subject and an image can be captured with the second imaging unit from the back side that faces a photographer (see Japanese Laid-open Patent Publication No. 2004-147046). With this technology, by displaying a front-side image captured by the first capturing unit and a back-side image captured by the second capturing unit on a single display monitor, the front-side image and the back-side image can be selectively captured.

SUMMARY OF THE INVENTION

An imaging device according to an aspect of the present invention comprises: an imaging unit that images a subject and that continuously creates image data on the subject; a face detector that detects a face of the subject included in the image data; a trimming unit that creates a face image by cutting out, from a live view image, a face area that includes the face of the subject detected by the face detector; and a display controller that displays the face image created by the trimming unit at a display position that is specified in a display area of a display unit.

A display method according to another aspect of the present invention for executing, at the time of capturing, by an imaging device that includes an imaging unit, which images a subject and continuously creates image data on the subject, and that includes a display unit, which chronologically displays live view images associated with the image data created by the imaging unit, comprises: detecting a face of the subject included in the live view images; creating a face image by cutting out, from the live view images, a face area including the subject and trimming the cut out face area; and displaying the face image at a display position specified in a display area of the display unit.

A non-transitory computer-readable storage medium according to still another aspect of the present invention is stored with an executable program thereon, wherein the program instructs a processor included in an imaging device, which includes an imaging unit that images a subject and that continuously creates image data on the subject and includes a display unit that chronologically displays live view images associated with the image data created by the imaging unit, to perform: detecting a face of the subject included in the live view images; creating a face image by cutting out, from the live view images, a face area including the subject and trimming the cut out face area; and displaying the face image at a display position specified in a display area of the display unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
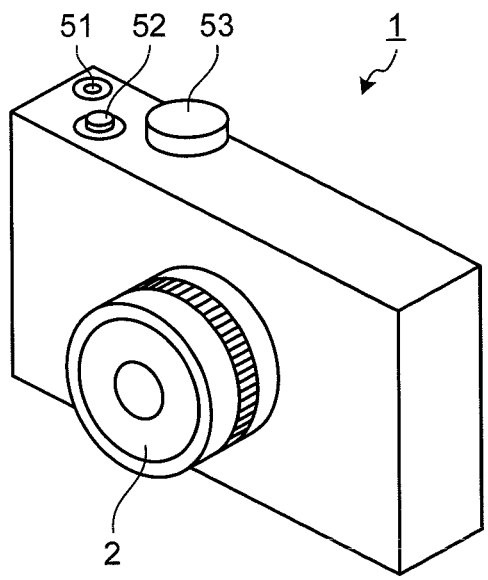
FIG. 1 is a schematic diagram illustrating the configuration of an imaging device, viewed from the side facing a subject, according to a first embodiment of the present invention.

In the following, preferred embodiments of the present invention will be described. The present invention is not limited to the embodiments described below. In the drawings, components that are identical to those in embodiments are assigned the same reference numerals.

First Embodiment

Figure 2:
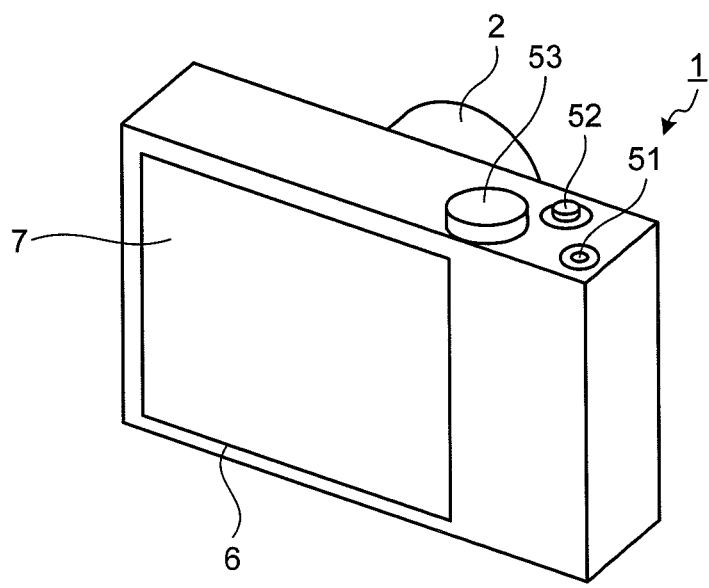
FIG. 2 is a schematic diagram illustrating the configuration of the imaging device, viewed from the side facing the photographer, according to the first embodiment of the present invention.
Figure 3:
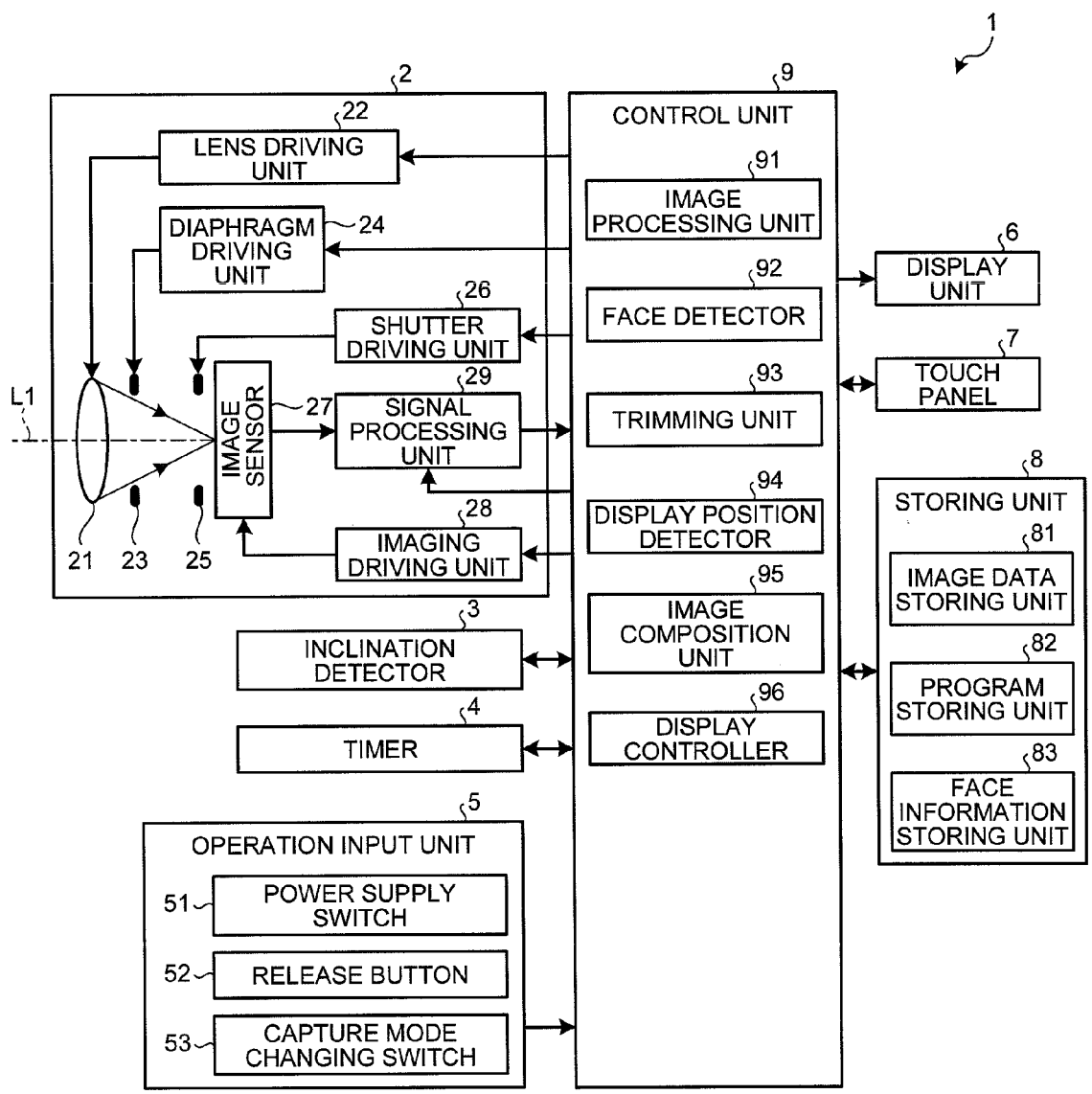
FIG. 3 is a block diagram illustrating the configuration of the imaging device according to the first embodiment of the present invention.

FIG. 1 is a schematic diagram illustrating the configuration of an imaging device, viewed from the side facing a subject (front-surface side), according to a first embodiment of the present invention. FIG. 2 is a schematic diagram illustrating the configuration of the imaging device, viewed from the side facing the photographer (back surface side), according to the first embodiment of the present invention. FIG. 3 is a block diagram illustrating the configuration of the imaging device according to the first embodiment of the present invention.

As illustrated in FIGS. 1 to 3, an imaging device 1 includes an imaging unit 2, an inclination detector 3, a timer 4, an operation input unit 5, a display unit 6, a touch panel 7, a storing unit 8, and a control unit 9.

The imaging unit 2 images a subject and creates image data of the subject. The imaging unit 2 includes a lens unit 21, a lens driving unit 22, a diaphragm 23, a diaphragm driving unit 24, a shutter 25, a shutter driving unit 26, an image sensor 27, an imaging driving unit 28, and a signal processing unit 29.

The lens unit 21 is configured from multiple lens groups capable of focusing and zooming and collects light from a predetermined view area. The lens driving unit 22 is configured from a stepping motor or a DC motor. The lens driving unit 22 allows the lens groups in the lens unit 21 to move along an optical axis L1, thus changing, for example, focal points or the focal length of the lens unit 21.

The diaphragm 23 adjusts exposure by limiting the amount of incident light collected by the lens unit 21. The diaphragm driving unit 24 is configured from, for example, a stepping motor and drives the diaphragm 23.

The shutter 25 sets the state of the image sensor 27 to an exposure state or to a light-blocking state. The shutter driving unit 26 is configured from, for example, a stepping motor and drives the shutter 25 in accordance with a release signal.

The image sensor 27 is configured from, for example a charge coupled device (CCD) or a complementary metal oxide semiconductor (CMOS). The image sensor 27 receives light collected by the lens unit 21 and performs photoelectric conversion, thus converting the light to an electrical signal (analog signal). The imaging driving unit 28 creates a timing pulse that drives the image sensor 27 and outputs, to the signal processing unit 29, the electrical signal subjected to the photoelectric conversion by the image sensor 27.

The signal processing unit 29 is configured from, for example, an analog amplifier or an A/D converter. The signal processing unit 29 performs a signal process, such as amplification (gain adjustment), on an electrical signal output from the image sensor 27 to convert the electrical signal to digital image data and outputs the digital image data to the control unit 9.

The inclination detector 3 is configured using an acceleration sensor. The inclination detector 3 detects the inclination state of the imaging device 1 by detecting the acceleration of the imaging device 1. Specifically, the inclination detector 3 detects the inclination (angle of inclination) of the imaging device 1 if a horizontal plane is taken as a reference.

The timer 4 has a function of measuring the time and determining the capturing date and time. The timer 4 outputs date and time data to the control unit 9 in order to add the date and time data to the imaged image data.

The operation input unit 5 includes a power supply switch 51 that switches the state of a power supply of the imaging device 1 between on and off states; a release button 52 that receives an input of a release signal that gives a capturing instruction; and a capture mode changing switch 53 that switches various capture modes that are set in the imaging device 1.

The display unit 6 is implemented by using a display panel, such as a liquid crystal panel or an organic electro luminescence (EL) panel. The display unit 6 displays an image associated with the image data created by the imaging unit 2. The display unit 6 appropriately displays information on the operation performed by the imaging device 1 and information on the capturing of an image.

The touch panel 7 is arranged on a display screen of the display unit 6. The touch panel 7 detects, on the basis of information displayed on the display unit 6, a position touched by a user and receives an input of an instruction signal in accordance with the touched position. In general, a resistive touch panel, a capacitive touch panel, or an optical touch panel is used for the touch panel. In the first embodiment, any type can be used for the touch panel. Furthermore, in the first embodiment, the touch panel 7 functions as an input unit.

The storing unit 8 is implemented by using a semiconductor memory, such as a flash memory and a random access memory (RAM), that is arranged inside the imaging device 1. The storing unit 8 stores therein data that is being executed by the control unit 9. The storing unit 8 includes an image data storing unit 81 that stores therein image data imaged by the imaging unit 2; a program storing unit 82 that stores therein various programs executed by the imaging device 1; and a face information storing unit 83 that stores therein face image information that is referred to when a face of a subject is detected and that stores therein feature information in which the face of the subject previously registered by a user is stored. Furthermore, the storing unit 8 may also be a computer-readable storage medium, such as a memory card, that is externally mounted.

The control unit 9 is configured from, for example, a central processing unit (CPU). In accordance with an instruction signal or a switch signal received from the operation input unit 5 or the touch panel 7, the control unit 9 performs overall operation control of the imaging device 1 by sending an instruction associated with each unit forming the imaging device 1 or by transferring data.

In the following, the configuration of the control unit 9 will be described in detail. The control unit 9 includes an image processing unit 91, a face detector 92, a trimming unit 93, a display position detector 94, an image composition unit 95, and a display controller 96.

The image processing unit 91 performs various kinds of image processing on image data received from the signal processing unit 29. Specifically, the image processing unit 91 performs, on image data (RAW data), image processing including an edge enhancement process, a white balance process, and gamma correction. The image processing unit 91 performs a compression process and a decompression process on image data using the Joint Photographic Experts Group (JPEG) compression method or the like.

The face detector 92 detects the face of a subject included in an image associated with image data. Specifically, the face detector 92 detects the face of a person included in an image by using pattern matching. Furthermore, in addition to the face of a person, the face detector 92 may also detect the face of a dog, a cat, and the like. Furthermore, the face detector 92 may also detect the face of a person by using a known technology other than pattern matching.

The trimming unit 93 creates a face image by cutting out, from an image, the face area containing the face of a subject detected by the face detector 92. If the face detector 92 detects multiple faces of subjects from an image, the trimming unit 93 creates multiple face images by cutting out each face area from the image.

The display position detector 94 detects a display position of a face of a subject on an image detected by the face detector 92. Specifically, if the display screen in the display unit 6 (see FIG. 2) is assumed to be a coordinate system with the lower left part of the display screen in the display unit 6 (see FIG. 2) as the origin, with the lateral direction of the display unit 6 as the X-axis, and with the vertical direction as the Y-axis, the display position detector 94 detects the coordinates used as the display position of a face of a subject detected by the face detector 92.

The image composition unit 95 creates a composition image by combining a face image created by the trimming unit 93 with a setting image at a specified position that is previously set on the setting image. Specifically, the image composition unit 95 creates a composition image by combining the face image created by the trimming unit 93 with a setting image, which is associated with the image data stored in the image data storing unit 81, at a specified position.

The display controller 96 displays a face image, which is created by the trimming unit 93, on the display position specified in a display area of the display unit 6. In accordance with an input of an instruction signal received by the touch panel 7, the display controller 96 displays a face image on the display unit 6 by moving the display position that displays the face image. In accordance with a signal that changes the size of the face image received by the touch panel 7, the display controller 96 changes the size of the face image and displays it on the display unit 6.

In the imaging device 1 having the above configuration, an electronic viewfinder, a flash, a communication unit that can make two-way communication with an external processing unit, and the like may also be arranged.

Figure 4:
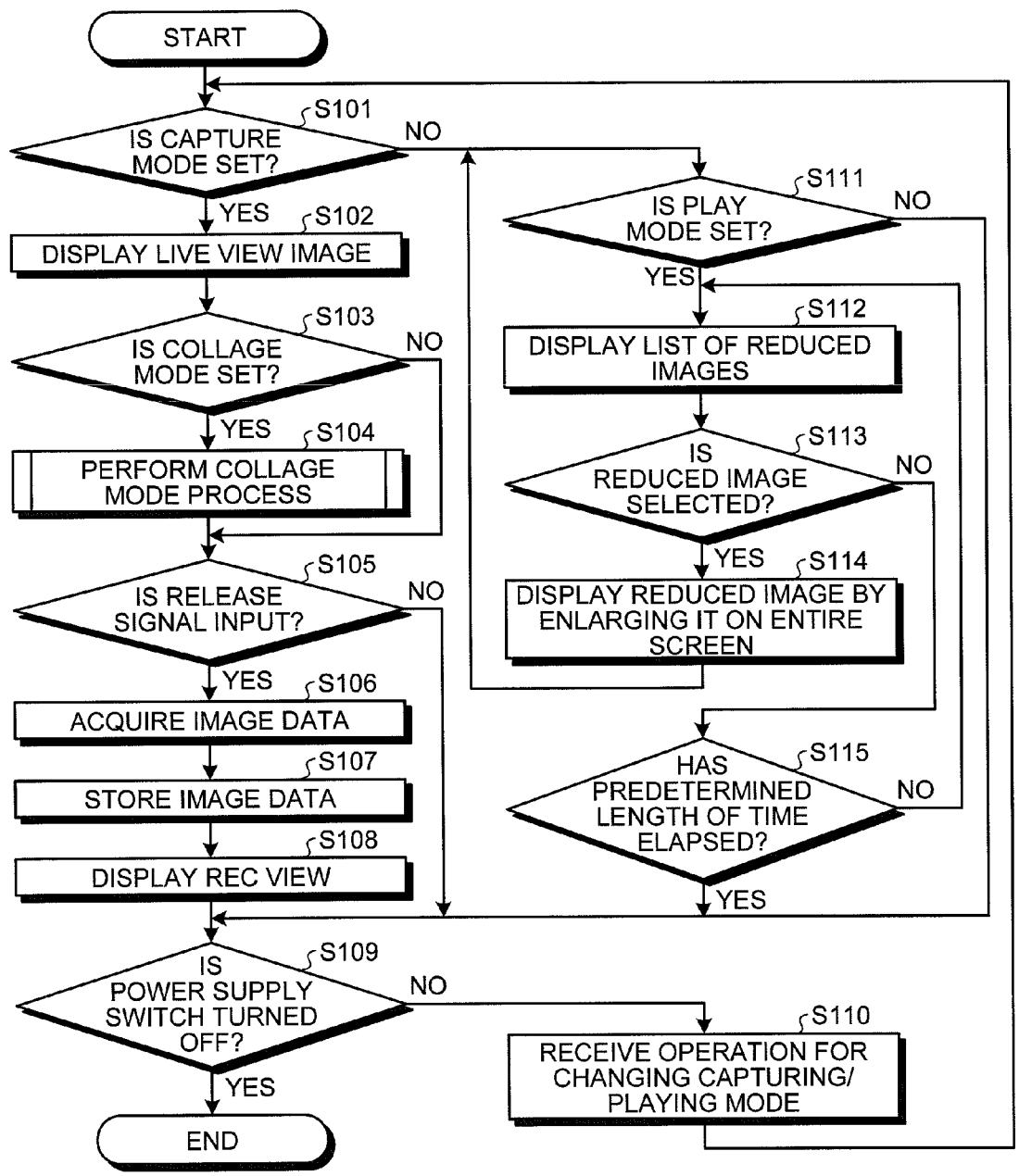
FIG. 4 is a flowchart illustrating the flow of a process performed by the imaging device according to the first embodiment of the present invention.

In the following, a process performed by the imaging device 1 according to the first embodiment will be described. FIG. 4 is a flowchart illustrating the flow of a process performed by the imaging device 1.

In FIG. 4, a description will be given of a case in which the imaging device 1 is in a capture mode (Yes at Step S101). In such a case, the display controller 96 displays, on the display unit 6, a live view image associated with image data that are sequentially created by the imaging unit 2 in short time intervals (Step S102).

Figure 5:
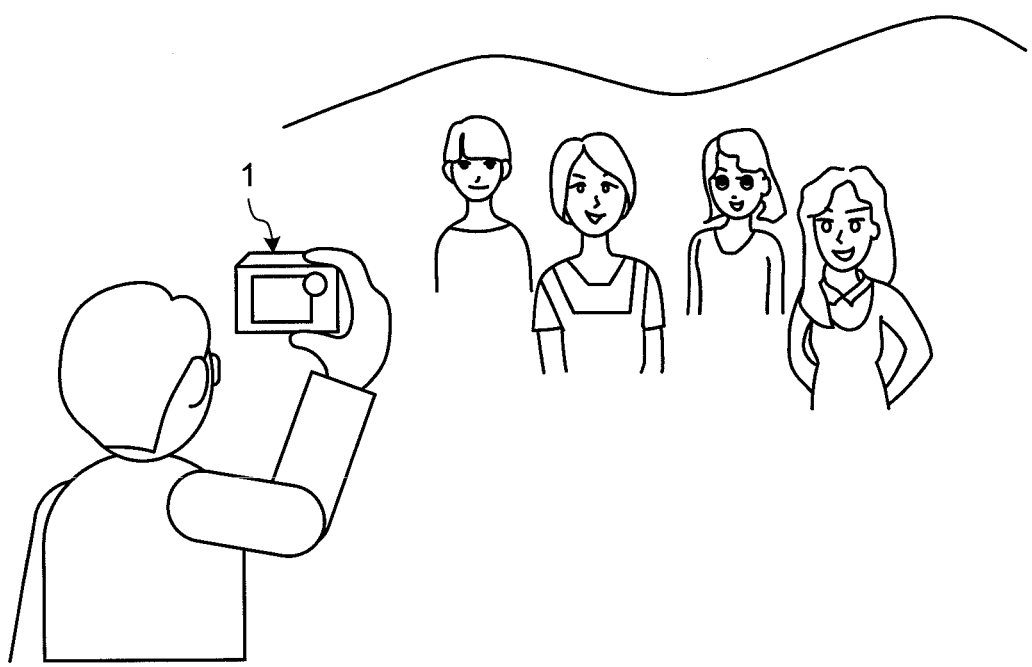
FIG. 5 is a schematic diagram illustrating a situation in which a photographer captures an image using the imaging device.
Figure 6:
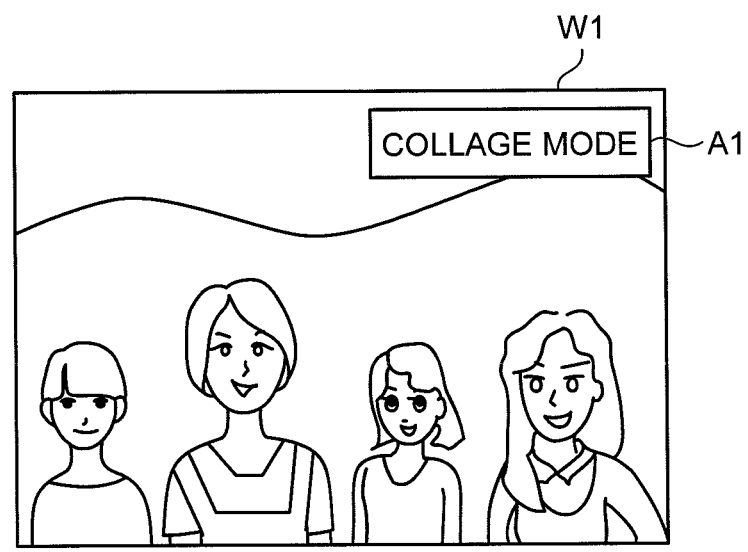
FIG. 6 is a schematic diagram illustrating a representative image from among live view images that are sequentially displayed in time series by a display unit when the situation is that illustrated in FIG. 5.

FIG. 5 is a schematic diagram illustrating a situation in which a photographer captures an image using the imaging device 1. FIG. 6 is a schematic diagram illustrating a representative image W1 from among live view images that are sequentially displayed in time series by a display unit 6 when the situation is that illustrated in FIG. 5. As illustrated in FIGS. 5 and 6, while viewing, for example, the live view image W1 illustrated in FIG. 6, the photographer determines the composition of the picture when taking a picture of a subject.

Subsequently, the control unit 9 determines whether the imaging device 1 is in a collage mode (Step S103). Specifically, as illustrated in FIG. 6, in accordance with an instruction signal that is input from the touch panel 7, the control unit 9 determines whether a collage icon A1, which sets the collage mode in which an image is superimposed on the live view image W1 displayed by the display unit 6, is selected. If the control unit 9 determines that the collage mode is selected in the imaging device 1 (Yes at Step S103), the imaging device 1 creates a face image by cutting out a face area that has a part that includes the face of the subject detected by the face detector 92 and then executes a collage mode process in which the face image is displayed at a previously specified display position in a display area of the display unit 6 (Step S104). The collage mode process will be described in detail later.

In contrast, if the control unit 9 determines that the collage mode process is not selected in the imaging device 1 (No at Step S103), the imaging device 1 moves to Step S105, which will be described below.

If a release signal is input due to the release button 52 being operated at Step S105 (Yes at Step S105), the imaging device 1 acquires image data under the control of the control unit 9 (Step S106). The image data acquired by the imaging device 1 includes image data subjected to the collage mode process.

Subsequently, the control unit 9 allows the image data storing unit 81 to store the image data by associating the image data with header information that contains the date and time and the data size (Step S107).

Then, the display controller 96 displays, using rec view, an image associated with the imaged image data for a predetermined length of time (e.g., 2 seconds) on the display unit 6 (Step S108).

Subsequently, the control unit 9 determines whether the power supply of the imaging device 1 is in the off state due to the power supply switch 51 being operated (Step S109). If the control unit 9 determines that the power supply of the imaging device 1 is in the off state (Yes at Step S109), the imaging device 1 ends this process. In contrast, if the control unit 9 determines that the power supply of the imaging device 1 is not in the off state (No at Step S109), the imaging device 1 moves to Step S110.

If a mode change signal is input from the capture mode changing switch 53 at Step S110, the control unit 9 receives an operation for changing a capturing/playing mode in accordance with the mode change signal. In contrast, if the mode change signal is not input from the capture mode changing switch 53, the current mode is maintained. Then, the imaging device 1 returns to Step S101.

If a release signal is not input via the release button 52 within a predetermined length of time (e.g., 2 seconds) at Step S105 (No at Step S105), the imaging device 1 moves to Step S109.

In the following, a description will be given of a case in which the imaging device 1 is not in the capture mode (No at Step S101) but in a play mode (Yes at Step S111). In such a case, the display controller 96 displays, on the display unit 6, a list of reduced images (thumbnail images) associated with image data stored in the image data storing unit 81 (Step S112).

Subsequently, if a reduced image, which is displayed by enlarging the image via the operation input unit 5 or the touch panel 7, is selected (Yes at Step S113), the display controller 96 displays the selected reduced image on the display unit 6 for a predetermined length of time (e.g., 3 seconds) by enlarging the image on the entire screen (Step S114). Then, the imaging device 1 returns to Step S101.

In contrast, if a reduced image, which is displayed by enlarging the image via the operation input unit 5 or the touch panel 7, is not selected (No at Step S113), the control unit 9 determines whether a predetermined length of time (e.g., 5 seconds) has elapsed after the list of the reduced images is displayed (Step S115). If the control unit 9 determines that a predetermined length of time has elapsed after the list of the reduced images is displayed (Yes at Step S115), the imaging device 1 moves to Step S109. In contrast, if the control unit 9 determines that a predetermined length of time has not elapsed after the list of the reduced images is displayed (No at Step S115), the imaging device 1 returns to Step S112.

If the imaging device 1 is not in the play mode at Step S111 (No at Step S111), the imaging device 1 moves to Step S109.

Figure 7:
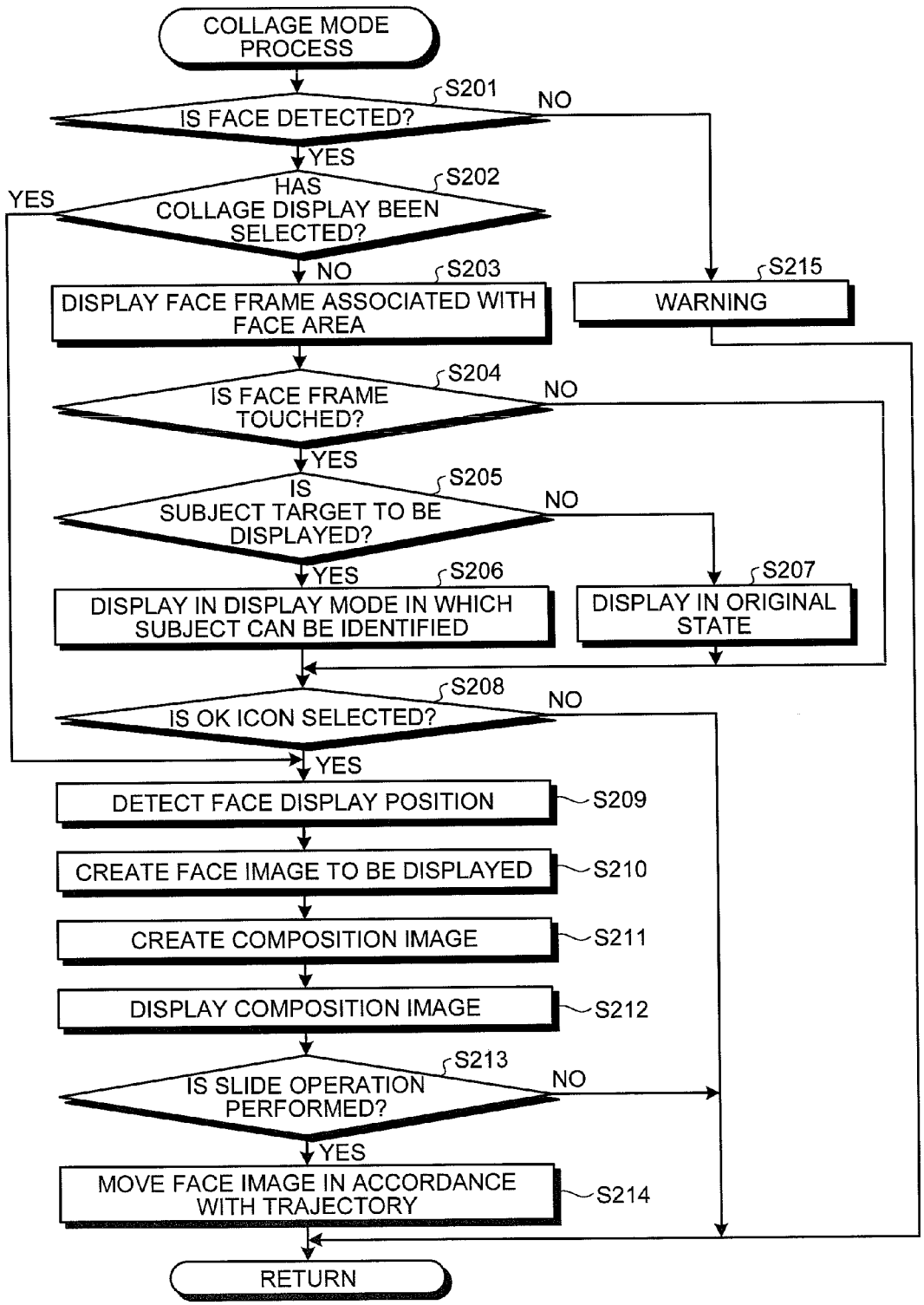
FIG. 7 is a flowchart illustrating the flow of a collage mode process illustrated in FIG. 4.

In the following, the collage mode process performed at Step S103 illustrated in FIG. 4 will be described. FIG. 7 is a flowchart illustrating the flow of the collage mode process.

In FIG. 7, a description will be given of a case in which the control unit 9 determines that the face detector 92 has detected the face of a subject included in the live view image (Yes at Step S201). In such a case, the control unit 9 determines whether a subject that is to be displayed in a collage display has been selected (Step S202). If the control unit 9 determines that a subject that is to be displayed in a collage display has been selected (Yes at Step S202), the imaging device 1 moves to Step S209, which will be described later. In contrast, if a subject that is to be displayed in a collage display has not been selected (No at Step S202), the imaging device 1 moves to Step S203, which will be described later. Of course, all detected faces may also be the targets to be displayed.

Figure 8:
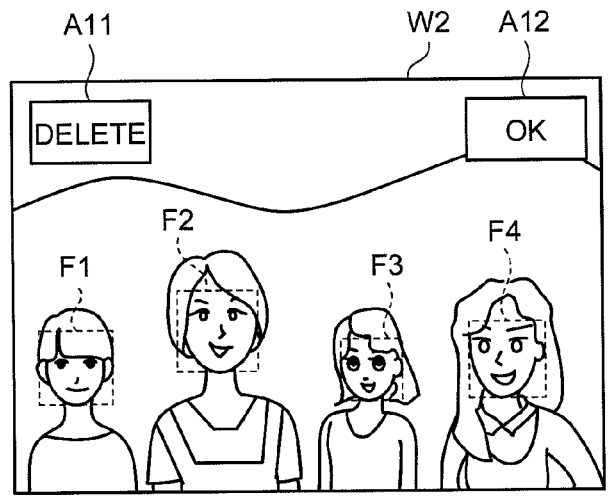
FIG. 8 is a schematic diagram illustrating an example of a live view image displayed by a display unit.

At Step S203, the display controller 96 displays, on the display unit 6, a face frame (window) associated with a face area including the face of the subject detected by the face detector 92. Specifically, as illustrated in FIG. 8, the display controller 96 displays, on the display unit 6, rectangular face frames F1 to F4 associated with face areas of multiple subjects on a live view image W2 detected by the face detector 92. Furthermore, the display controller 96 displays, on the display unit 6, a delete icon A11, which receives an input of an instruction signal that gives an instruction to delete a subject that is not to be displayed in the collage mode, and an OK icon A12, which receives an input of an instruction signal that uses the collage display. In FIG. 8, the display controller 96 displays the face frames in a rectangular shape on the display unit 6. However, a face frame in a circular shape may also be displayed on the display unit 6.

Figure 9:
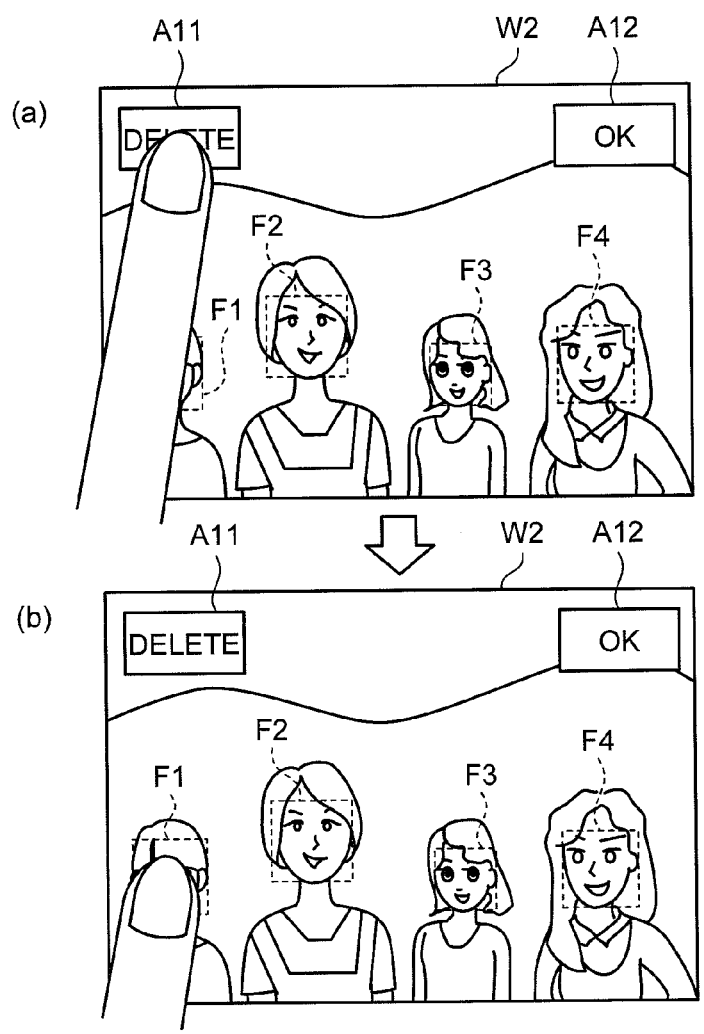
FIG. 9 is a schematic diagram illustrating an example of a live view image displayed by the display unit.

Subsequently, the control unit 9 determines whether the delete icon A11 is selected and whether a portion in a face frame area associated with the face area of the subject is touched (Step S204). Specifically, as illustrated in FIG. 9, in accordance with an instruction signal that is input from the touch panel 7, the control unit 9 determines whether a user has touched the delete icon A11 on the live view image W2 displayed by the display unit 6 (FIG. 9(a)) and has touched a portion in any one of the areas of the face frames F1 to F4, for example, a portion in the area of the face frame F1, associated with the face areas of the subjects (FIG. 9(b)). If the control unit 9 determines that the delete icon A11 is selected and a portion in any one of the areas of the face frames F1 to F4 associated with the face areas of the subjects is touched (Yes at Step S204), the imaging device 1 moves to Step S205, which will be described later. In contrast, if the control unit 9 determines that the delete icon A11 is not selected and no portion in the areas of the face frames F1 to F4 associated with the face areas of the subjects is touched (No at Step S204), the imaging device 1 moves to Step S208, which will be described later.

Figure 10:
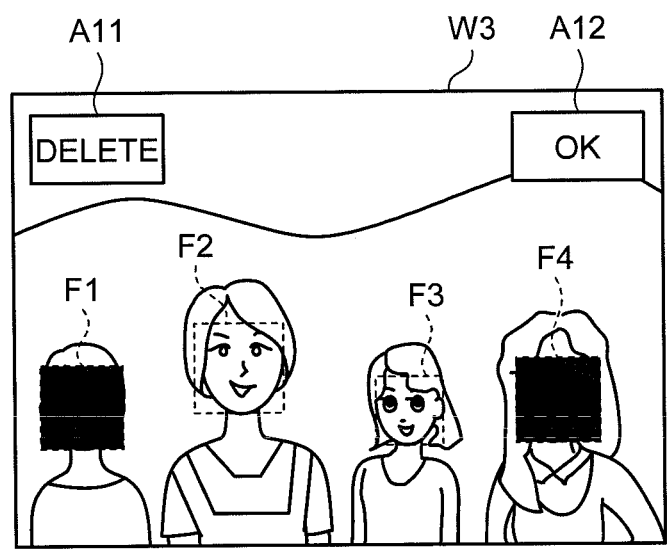
FIG. 10 is a schematic diagram illustrating an example of a live view image displayed by the display unit.

At Step S205, the control unit 9 determines whether the face frame associated with the face area of the touched subject is the target for the collage display. If the control unit 9 determines that the frame associated with the face area of the touched subject is the target for the collage display (Yes at Step S205), the display controller 96 displays the inside of the face frame associated with the face area of the touched subject on the display unit 6 in a display mode in which the target subject can be identified (Step S206). For example, as illustrated in FIG. 10, the display controller 96 displays, on the display unit 6, the face frame F1 and the face frame F4 associated with the face areas of the touched subjects in a state in which the inside of the face frames F1 and F4 are solidly filled in black (non-display state). Furthermore, the display controller 96 may also display a face frame associated with a face area of a touched subject on the display unit 6 in the display mode in which the target subject can be identified by using a white frame or a bold frame.

In contrast, if the control unit 9 determines that the face frame associated with the face area of the touched subject is not the target for the collage display (No at Step S205), the display controller 96 displays, on the display unit 6, the face frame associated with the face area of the touched subject by restoring the state of the inside of the face frame from the black filled state to the original state (Step S207).

Figure 11:
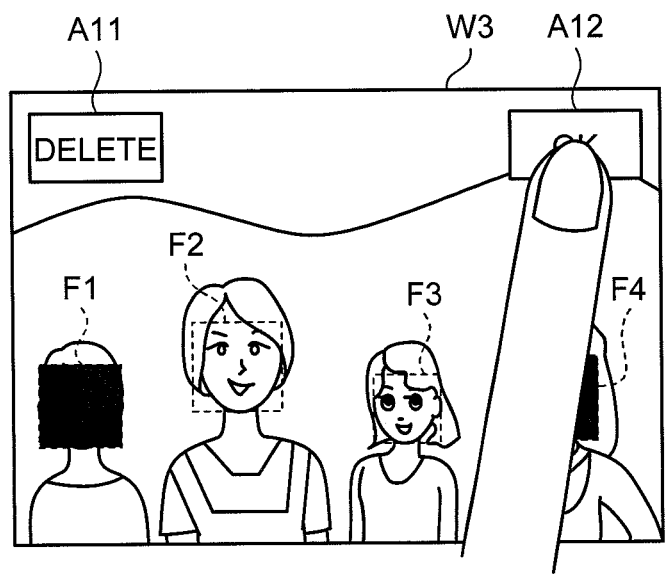
FIG. 11 is a schematic diagram illustrating an example of a live view image displayed by the display unit.

At Step S208, in accordance with the instruction signal that is input from the touch panel 7, the control unit 9 determines whether the OK icon A12 is selected. Specifically, as illustrated in FIG. 11, in accordance with the instruction signal that is input from the touch panel 7, the control unit 9 determines whether the OK icon A12 displayed on the live view image W3 is selected. If the control unit 9 determines that the OK icon A12 is selected (Yes at Step S208), the imaging device 1 moves to Step S209, which will be described later. In contrast, if the control unit 9 determines that the OK icon A12 is not selected within a predetermined length of time (e.g., 3 seconds) (No at Step S208), the imaging device 1 returns to the main routine illustrated in FIG. 4.

At Step S209, the display position detector 94 detects a display position in which the face of the subject to be displayed on a live view image is displayed. Specifically, when the situation is that illustrated in FIG. 11, the display position detector 94 detects display positions of face frames F2 and F3 to be displayed on a live view image W3.

Subsequently, the trimming unit 93 creates a face image by cutting out, from the image, a face area that has a part that includes the face to be displayed in the collage display from among the multiple faces detected by the face detector 92 (Step S210). Specifically, the trimming unit 93 creates a face image by cutting out, from the live view image W3, the face areas that have a part that includes the faces of the subjects in the face frames F2 and F3 illustrated in FIG. 11. In such a case, the trimming unit 93 may also cut out the face area in a circular shape in such a manner that the head area of the face is included. Furthermore, on the basis of the change in the contrast around the face frame, the trimming unit 93 may also create a face image by detecting the edge of the head area of the subject and by cutting out the face area along the detected edge. Of course, fine adjustment of the cutting out may also be performed using a touch operation.

Figure 12:
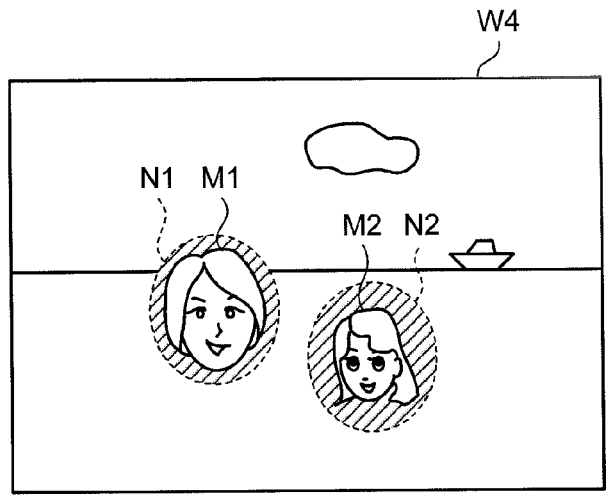
FIG. 12 is a schematic diagram illustrating an example of a composition image created by an image composition unit.

Subsequently, the image composition unit 95 creates a composition image by combining the face image created by the trimming unit 93 with a setting image at a specified position that is previously set on the setting image (Step S211). Specifically, as illustrated in FIG. 12, the image composition unit 95 acquires image data specified by a user from among multiple image data stored in the image data storing unit 81 and creates a composition image W4 by combining face images M1 and M2 with a white portion N1 and a white portion N2, which are specified positions of the images associated with the acquired image data. The specified position is a position in the image associated with the display position of the face detected by the display position detector 94. Furthermore, the display controller 96 displays the area including the specified positions such that the area can be identified, for example, using the white portion N1 and the white portion N2 having a solid white portion. Accordingly, because the vicinity of the face image M1 and the face image M2 that are to be subjected to composition is enhanced compared with the rest of the image, it is possible to make the image similar to that produced by using a collage technique. In FIG. 12, to represent the white portions N1 and N2, these portions are illustrated by the hatching. Furthermore, a user does not need to previously set the setting image with which the face image is combined. For example, it may also be possible to set an image associated with the most recent image data having the latest date from among multiple image data stored in the image data storing unit 81.

Thereafter, the display controller 96 displays the composition image created by the image composition unit 95 on the display unit 6 (Step S212). Specifically, the display controller 96 displays the composition image W4 illustrated in FIG. 12 on the display unit 6.

Subsequently, in accordance with an instruction signal that is input from the touch panel 7, the control unit 9 determines whether the slide operation for moving the display position of the face image contained in the composition image displayed by the display unit 6 is performed (Step S213). If the control unit 9 determines that the slide operation for moving the moving the display position of the face image contained in the composition image is performed (Yes at Step S213), the imaging device 1 moves to Step S214. In contrast, if the control unit 9 determines that the slide operation for moving the moving the display position of the face image contained in the composition image is not performed within a predetermined length of time (3 seconds) (No at Step S213), the imaging device 1 returns to the main routine illustrated in FIG. 4.

Figure 13:
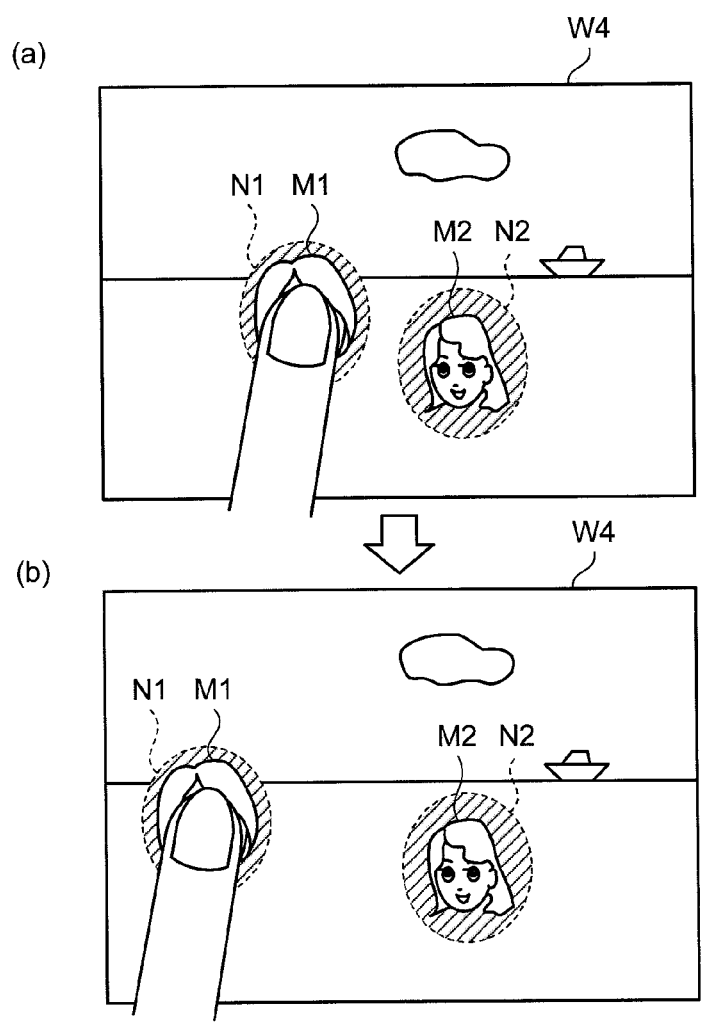
FIG. 13 is a schematic diagram illustrating a slide operation that moves a face image.

At Step S214, the display controller 96 displays the display position of the face image on the display unit 6 by moving the display position in accordance with the trajectory of the slide operation performed by a user. Specifically, as illustrated in FIG. 13, in accordance with the trajectory of the slide operation performed by a user (FIG. 13 (a)→FIG. 13 (b)), the display controller 96 displays the display position on the display unit 6 by moving the display position of the face image M1. Then, the imaging device 1 returns to the main routine illustrated in FIG. 4.

In the following, a description will be given of a case in which, at Step S201, the control unit 9 determines that the face detector 92 does not detect the face of the subject contained in the live view image (No at Step S201). In such a case, the display controller 96 displays, on the display unit 6, a warning indicating that the collage mode cannot be displayed on the live view image that is displayed by the display unit 6 (Step S215). Then, the imaging device 1 returns to the main routine illustrated in FIG. 4.

According to the first embodiment of the present invention described above, the display controller 96 displays each of the face images created by the trimming unit 93 at the display position that is previously specified in the display area of the display unit 6. Accordingly, it is possible to image a desired subject, which is obtained at the time of capturing, in an image with a simple operation and also possible to capture an image using collage representation.

Furthermore, according to the first embodiment of the present invention, even if many subjects are included in an image, it is possible for a user to capture only a desired subject.

Furthermore, according to the first embodiment of the present invention, the display controller 96 changes the position of a white portion in the live view image in accordance with the detection results obtained by the display position detector 94. Accordingly, because the position of the white portion on the collage display is changed every time a subject moves in the view area of the imaging device 1, various arrangements of the subject set by a photographer can be uniquely represented in a picture. Furthermore, when the photographer determines the composition of the picture to be captured, the photographer can capture a picture by intuitively understanding the display position in accordance with the position of the subject. The advantage of performing these processes during the live viewing is that the flexibility in image representation can be improved by, for example, changing the size of the subject using various distances to the subject, by reflecting the capturing operation, such as zooming, and by changing the expression. Furthermore, an image is more efficiently edited during the live viewing, in particular, to make the image conform to a background.

In the first embodiment, a photographer touches the delete icon All to select a subject that is not to be displayed; however, the configuration is not limited thereto. For example, the face information storing unit 83 may also previously store therein the features of the face of the desired subject and the display controller 96 may also automatically select, in accordance with the features, the face of the subject not to be displayed.

Figure 14:
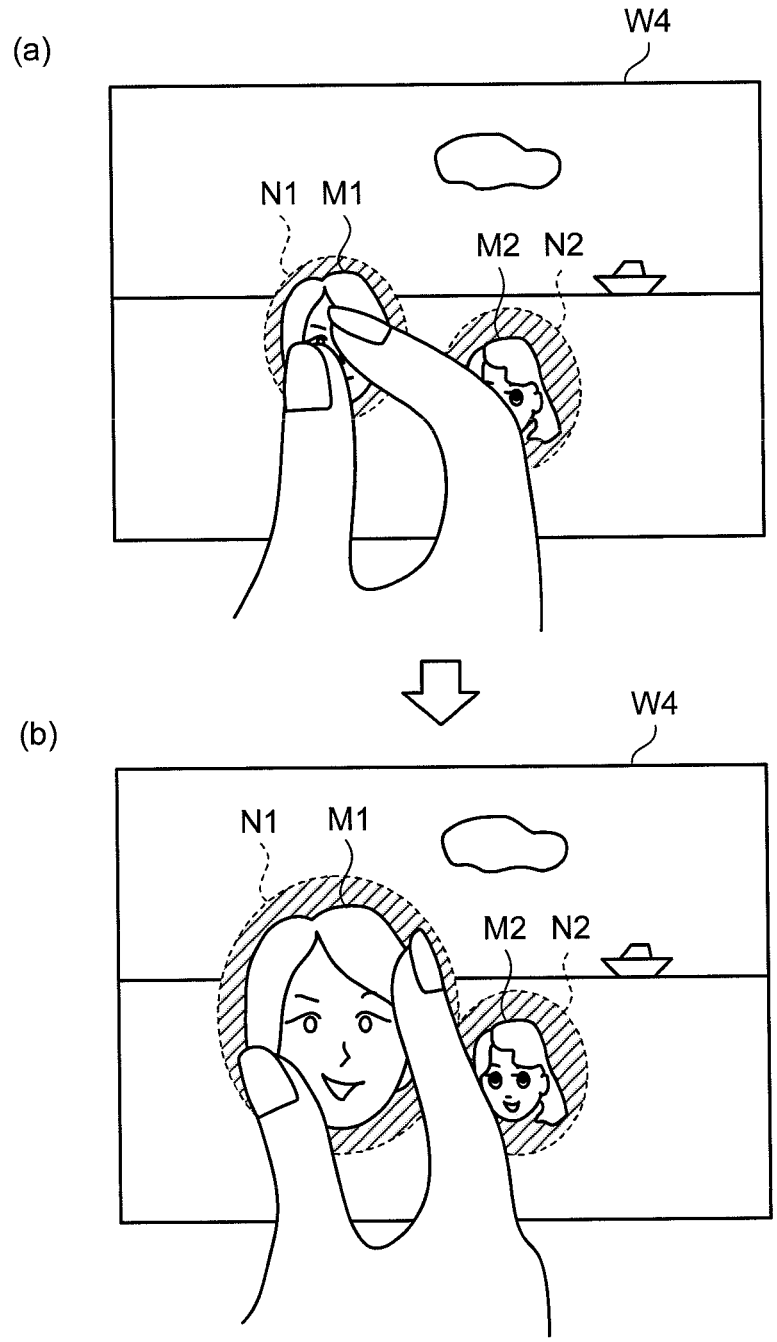
FIG. 14 is a schematic diagram illustrating an enlargement operation that enlarges a face image.

Furthermore, in the first embodiment, a user moves a face image in the slide operation; however, the configuration is not limited thereto. For example, as illustrated in FIG. 14, if the operation for increasing the distance between two points in the face image M1 in the composition image W4 displayed by the display unit 6 is performed (FIG. (a)→(b) FIG. 14), the display controller 96 may also display, on the display unit 6, the face image M1 by maintaining the aspect ratio at a constant value.

Of course, in addition to the operation described above, the size of the face may also be changed at a constant ratio using a touch operation or a tap operation. Furthermore, for the layout, there is no need to stick to the actual layout. It may also be possible to use a desired layout sample database (stored in a camera or outside of the camera) to make an image conform to a background.

Second Embodiment

In the following, a second embodiment of the present invention will be described. With an imaging device according to the second embodiment of the present invention, the configuration of the control unit differs from that in the first embodiment described above. Furthermore, in the operation performed by the imaging device according to the second embodiment of the present invention, the collage mode process differs from that performed in the first embodiment. Accordingly, in the following, after describing the configuration of the units that differ from those in the first embodiment described above, a collage mode process performed by the imaging device according to the second embodiment of the present invention will be described. In the drawings, components that are identical to those in the first embodiment are assigned the same reference numerals.

Figure 15:
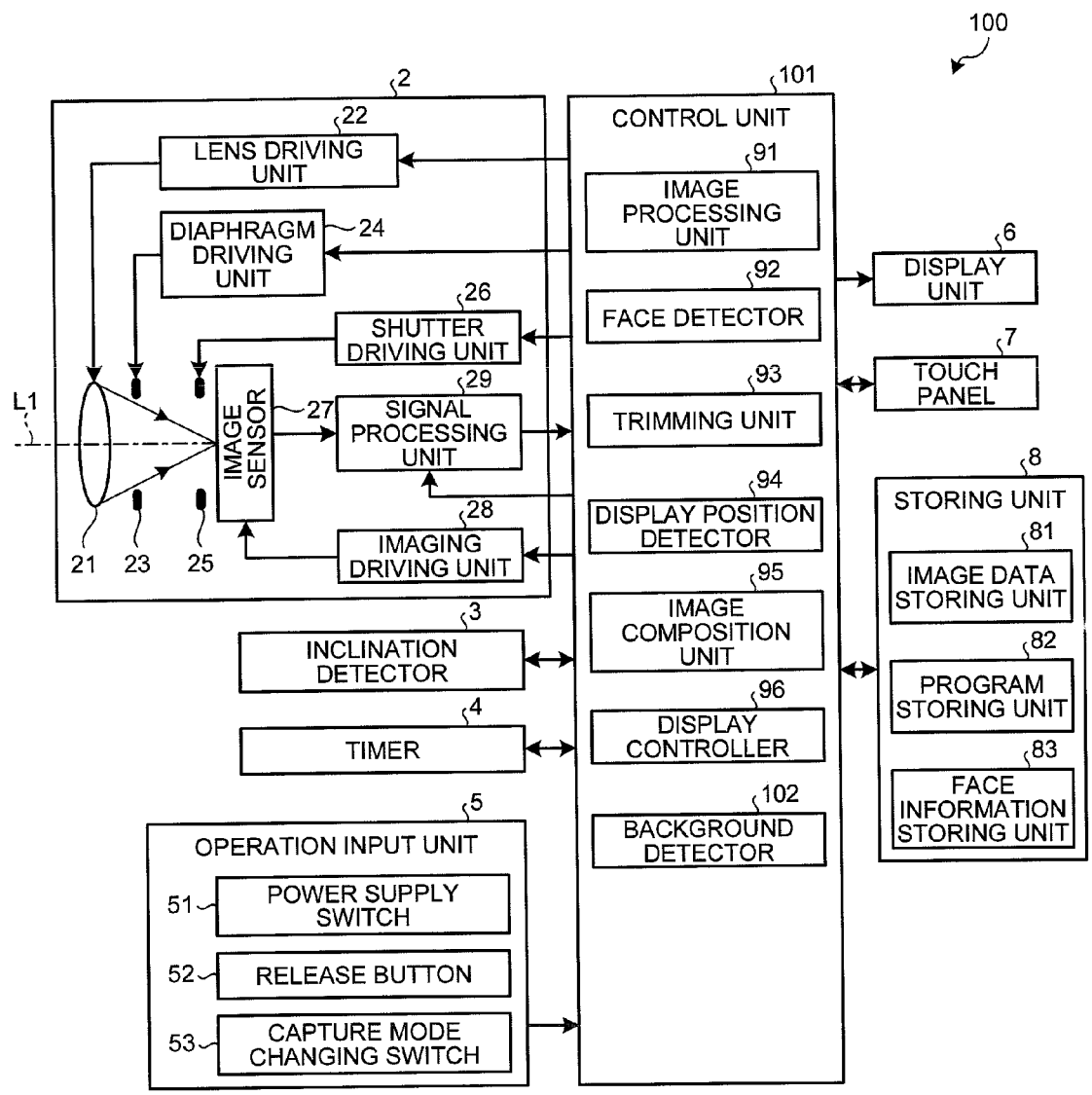
FIG. 15 is a block diagram illustrating the configuration of an imaging device according to a second embodiment of the present invention.

FIG. 15 is a block diagram illustrating the configuration of an imaging device 100 according to a second embodiment of the present invention. As illustrated in FIG. 15, a control unit 101 in the imaging device 100 includes the image processing unit 91, the face detector 92, the trimming unit 93, the display position detector 94, the image composition unit 95, the display controller 96, and a background detector 102.

The background detector 102 detects, as a background area from an image associated with image data created by the imaging unit 2, an area in which a person that includes the face area of the subject does not appear. Specifically, the background detector 102 divides the image associated with the image data created by the imaging unit 2 into multiple areas (e.g., nine areas); determines whether the face detected by the face detector 92 is included in the divided areas; and detects, as a background area, an area that does not include the face.

Figure 16:
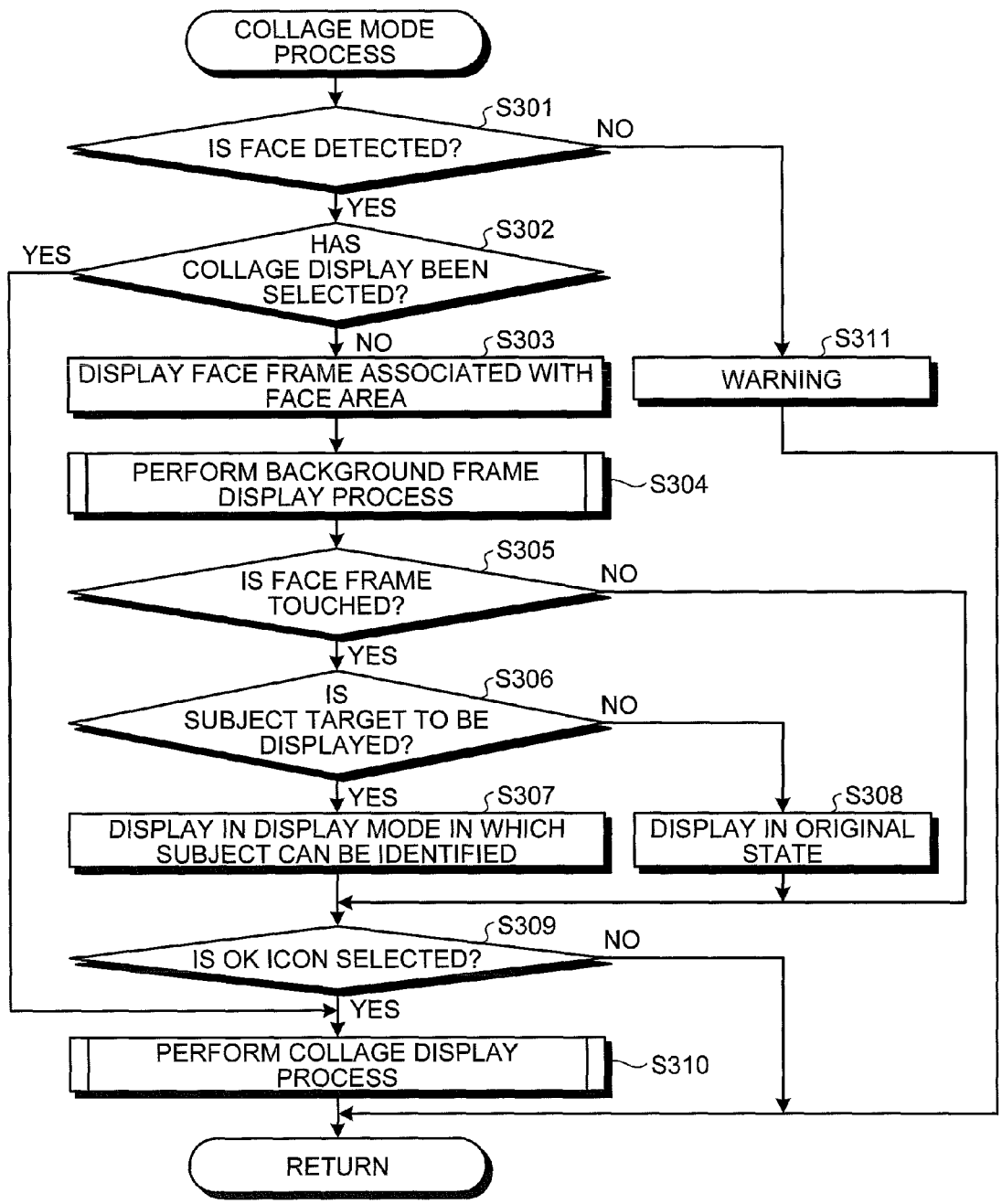
FIG. 16 is a flowchart illustrating the flow of a collage process performed by the imaging device according to the second embodiment of the present invention.

In the following, the collage mode process performed by the imaging device 100 according to the second embodiment will be described. FIG. 16 is a flowchart illustrating the flow of a collage process (Step S104 in FIG. 4) performed by the imaging device 100 according to the second embodiment of the present invention.

A description will be given of a case in FIG. 16 in which the control unit 101 determines that the face detector 92 detects the face of a subject included in a live view image (Yes at Step S301). In such a case, the control unit 101 determines whether a subject to be displayed in a collage display has been selected (Step S302). If the control unit 101 determines that a subject to be displayed in a collage display has been selected (Yes at Step S302), the imaging device 100 moves to Step S310, which will be described later. In contrast, if the control unit 101 determines that a subject to be displayed in a collage display has not been selected (No at Step S302), the imaging device 100 moves to Step S303, which will be described later.

At Step S303, the display controller 96 displays, on the display unit 6, a face frame associated with a face area that has a part that includes the face of the subject detected by the face detector 92.

Subsequently, the imaging device 100 performs a background frame display process for displaying, as a background frame on the live view image, a background image with which a face image is combined in the collage display (Step S304). The background frame display process will be described in detail later.

The processes performed at Steps S305 to S309 are the same as those performed at Steps S205 to S208 described with reference to FIG. 7; therefore, a description thereof will be omitted here.

At Step S310, the imaging device 100 cuts out a face area that has a part that includes the face of the subject detected by the face detector 92, creates a face image, combines the face image with the background image, and displays the composition image on the display unit 6, thus performing the collage display process. The collage display process will be described in detail later. After performing the process at Step S310, the imaging device 100 returns to the main routine illustrated in FIG. 4.

In the following, a description will be given of a case in which, at Step S301, the control unit 101 determines that the face detector 92 does not detect the face of a subject included in a live view image (No at Step S301). In such a case, the display controller 96 displays, on the display unit 6, a warning indicating that the collage mode cannot be displayed on the live view image that is displayed by the display unit 6 (Step S311). Then, the imaging device 100 returns to the main routine illustrated in FIG. 4.

Figure 17:
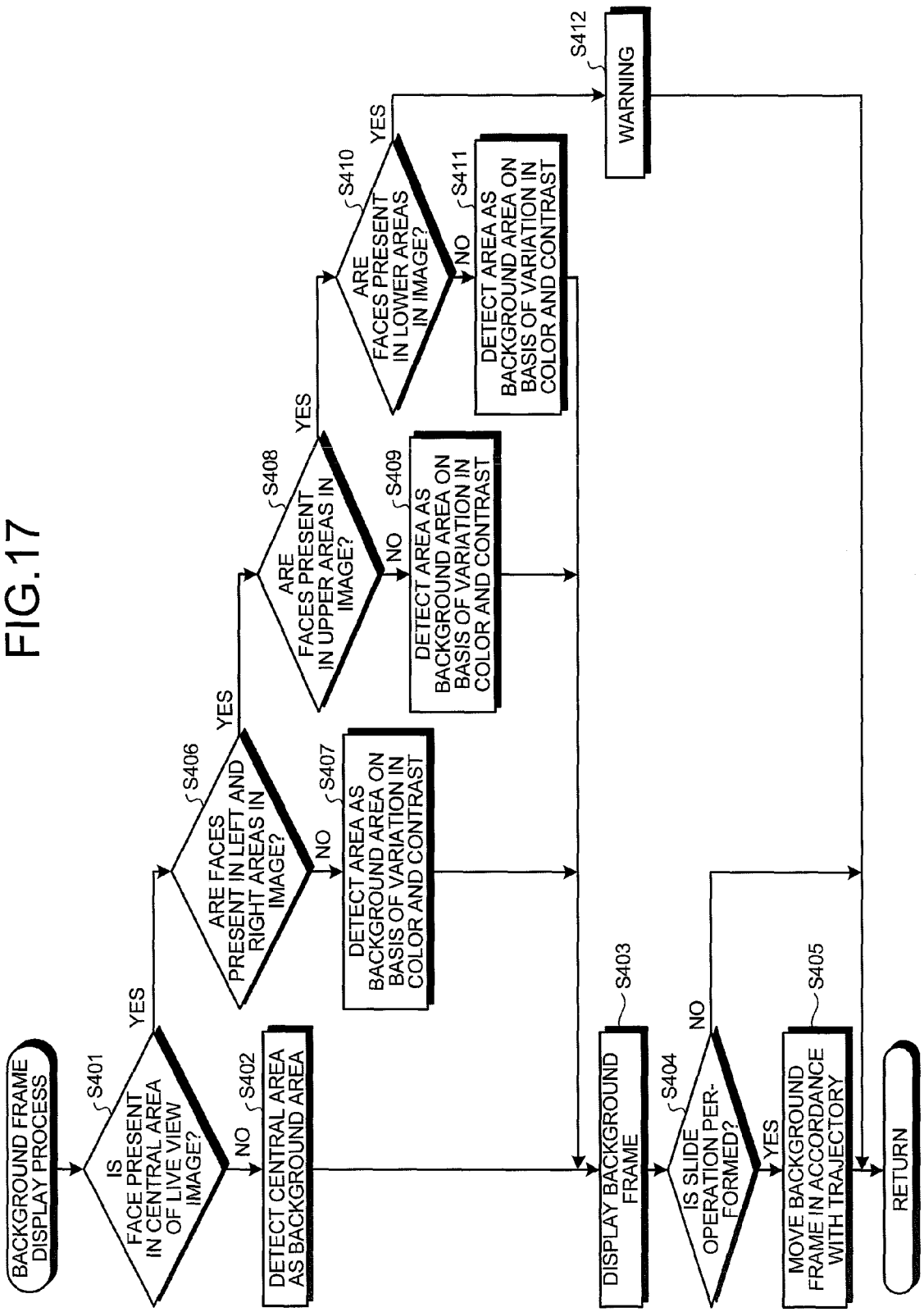
FIG. 17 is a flowchart illustrating the flow of a background frame display process illustrated in FIG. 16.

In the following, the background frame display process performed at Step S304 illustrated in FIG. 16 will be described. FIG. 17 is a flowchart illustrating the flow of the background frame display process.

As illustrated in FIG. 17, the background detector 102 determines whether the face of the subject detected by the face detector 92 is displayed in the central area of the live view image (Step S401).

Figure 18:
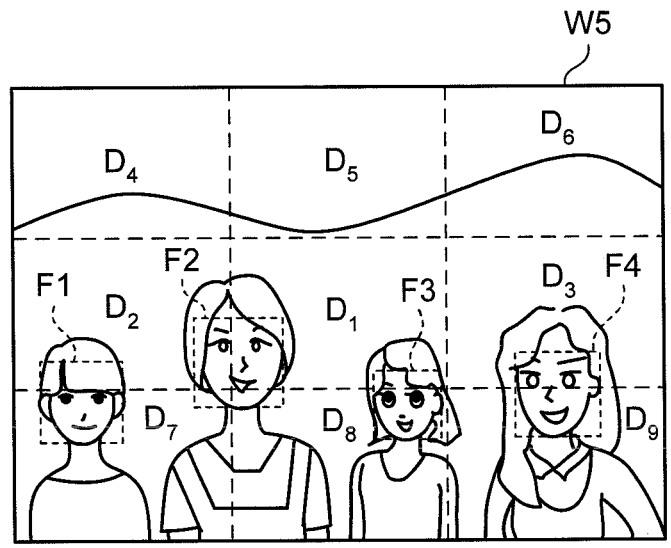
FIG. 18 is a schematic diagram illustrating an outline of a method performed by a background detector for determining a background area.

FIG. 18 is a schematic diagram illustrating an outline of a method performed by the background detector 102 for determining a background area. As illustrated in FIG. 18, the background detector 102 divides a live view image W5 into a predetermined areas, for example, nine areas ($D_1$ to $D_9$), and determines whether the face of the subject detected by the face detector 92 is present in the area ($D_1$) that corresponds to the center of the nine areas. In the situation illustrated in FIG. 18, because the faces of two subjects are captured in the central area $D_1$ in the live view image W5, the background detector 102 determines that the face is present in the central area $D_1$. In this way, the background detector 102 determines, for each area, whether the face of the subject detected by the face detector 92 is present. In FIG. 18, the live view image is divided into nine areas; however, the live view image may also be divided into 16 areas. If the number of pixels in the area to be divided is equal to or greater than one million, the number of areas may also be appropriately changed in accordance with the number of pixels of the image sensor 27.

At Step S401, if the background detector 102 determines that the face is present in the central area of the live view image (Yes at Step S401), the imaging device 100 moves to Step S406, which will be described later. In contrast, if the background detector 102 determines that the face is not present in the central area of the live view image (No at Step S401), the imaging device 100 moves to Step S402, which will be described later.

At Step S402, the background detector 102 detects the central area of the live view image W5 as the background area.

Subsequently, the display controller 96 displays, on the live view image displayed by the display unit 6, a background frame associated with the background area detected by the background detector 102 (Step S403).

Figure 19:
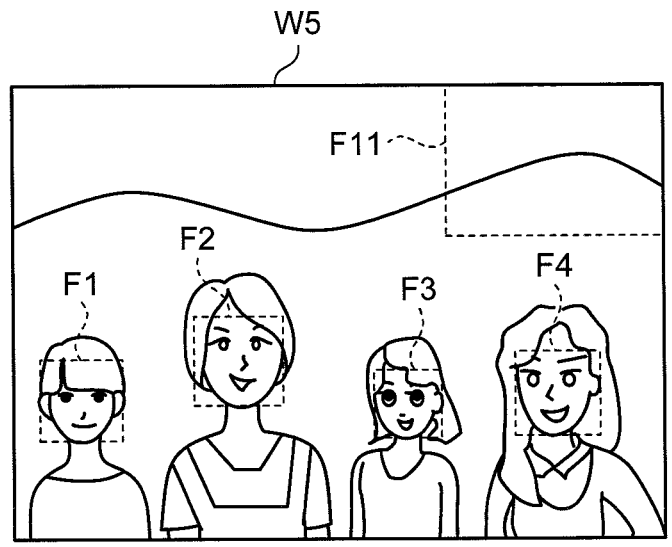
FIG. 19 is a schematic diagram illustrating an example of a live view image displayed by the display unit.

Specifically, as illustrated in FIG. 19, the display controller 96 displays, in the live view image W5 on the display unit 6, a background frame F11 associated with the background area detected by the background detector 102.

Subsequently, in accordance with an instruction signal that is input from the touch panel 7, the control unit 101 determines whether a slide operation for moving the background frame F11 displayed by the display unit 6 is performed (Step S404). If the control unit 101 determines that the slide operation for moving the background frame F11 is performed (Yes at Step S404), the imaging device 100 moves to Step S405. In contrast, if the control unit 101 determines that the slide operation for moving the background frame F11 is not performed (No at Step S404), the imaging device 100 returns to the collage mode process illustrated in FIG. 16.

At Step S405, in accordance with the trajectory of the slide operation performed by a user, the display controller 96 moves the background frame F11 and displays it on the display unit 6. Then, the imaging device 100 returns to the collage mode process illustrated in FIG. 16.

At Step S406, the background detector 102 determines whether the faces detected by the face detector 92 are present in the left and the right areas in the live view image W5. Specifically, as illustrated in FIG. 18, the background detector 102 determines whether the faces of the subjects detected by the face detector 92 are present in the left and the right areas $D_2$ and $D_3$ in the live view image W5. If the background detector 102 determines that the faces detected by the face detector 92 are present in the left and the right areas in the live view image (Yes at Step S406), the imaging device 100 moves to Step S408, which will be described later. In contrast, if the background detector 102 determines that the faces detected by the face detector 92 are not present in the left and the right areas in the live view image (No at Step S406), the imaging device 100 moves to Step S407, which will be described later.

At Step S407, on the basis of the variation in color and contrast between the left and the right areas in the live view image, the background detector 102 detects, as a background area, either one of the left area and the right area in the live view image. Specifically, the background detector 102 compares the variation in color and contrast in the left area and the right area and determines that the area having the larger variation is the background area. Then, the imaging device 100 moves to Step S403.

At Step S408, the background detector 102 determines whether the faces detected by the face detector 92 are present in the upper areas in the live view image. Specifically, as illustrated in FIG. 18, the background detector 102 determines whether the faces of the subjects detected by the face detector 92 are detected in upper areas $D_4$ to $D_5$ in the live view image W5. If the background detector 102 determines that the faces of the subjects detected by the face detector 92 are present in the upper areas in the live view image (Yes at Step S408), the imaging device 100 moves to Step S410, which will be described later. In contrast, if the background detector 102 determines that the faces of the subjects are not detected by the face detector 92 in the upper areas in the live view image (No at Step S408), the imaging device 100 moves to Step S409, which will be described later.

At Step S409, on the basis of the variation in color and contrast among the upper areas in the live view image, the background detector 102 determines that any one of the upper areas in the live view image is the background area. Specifically, in the situation illustrated in FIG. 18, the background detector 102 detects an upper area $D_6$ as a background area. Thereafter, the imaging device 100 moves to Step S403.

At Step S410, the background detector 102 determines whether the faces of the subjects detected by the face detector 92 are present in a lower area in the live view image. Specifically, as illustrated in FIG. 18, the background detector 102 determines whether the faces of the subjects detected by the face detector 92 are present in lower areas $D_7$ to $D_9$ in the live view image. If the background detector 102 determines that the faces of the subjects detected by the face detector 92 are present in the lower areas in the live view image (Yes at Step S410), the imaging device 100 moves to Step S412, which will be described later. In contrast, if the background detector 102 determines that the faces of the subjects detected by the face detector 92 are not present in the lower areas in the live view image (No at Step S410), the imaging device 100 moves to Step S411, which will be described later.

At Step S411, on the basis of the variation in color and contrast among the lower areas in the live view image, the background detector 102 determines that any one of the lower areas in the live view image is the background area. Then, the imaging device 100 moves to Step S403.

At Step S412, the display controller 96 displays, on the live view image displayed by the display unit, a warning indicating that the background detector 102 has not detected a background. Thereafter, the imaging device 100 returns to the collage mode process illustrated in FIG. 16.

Figure 20:
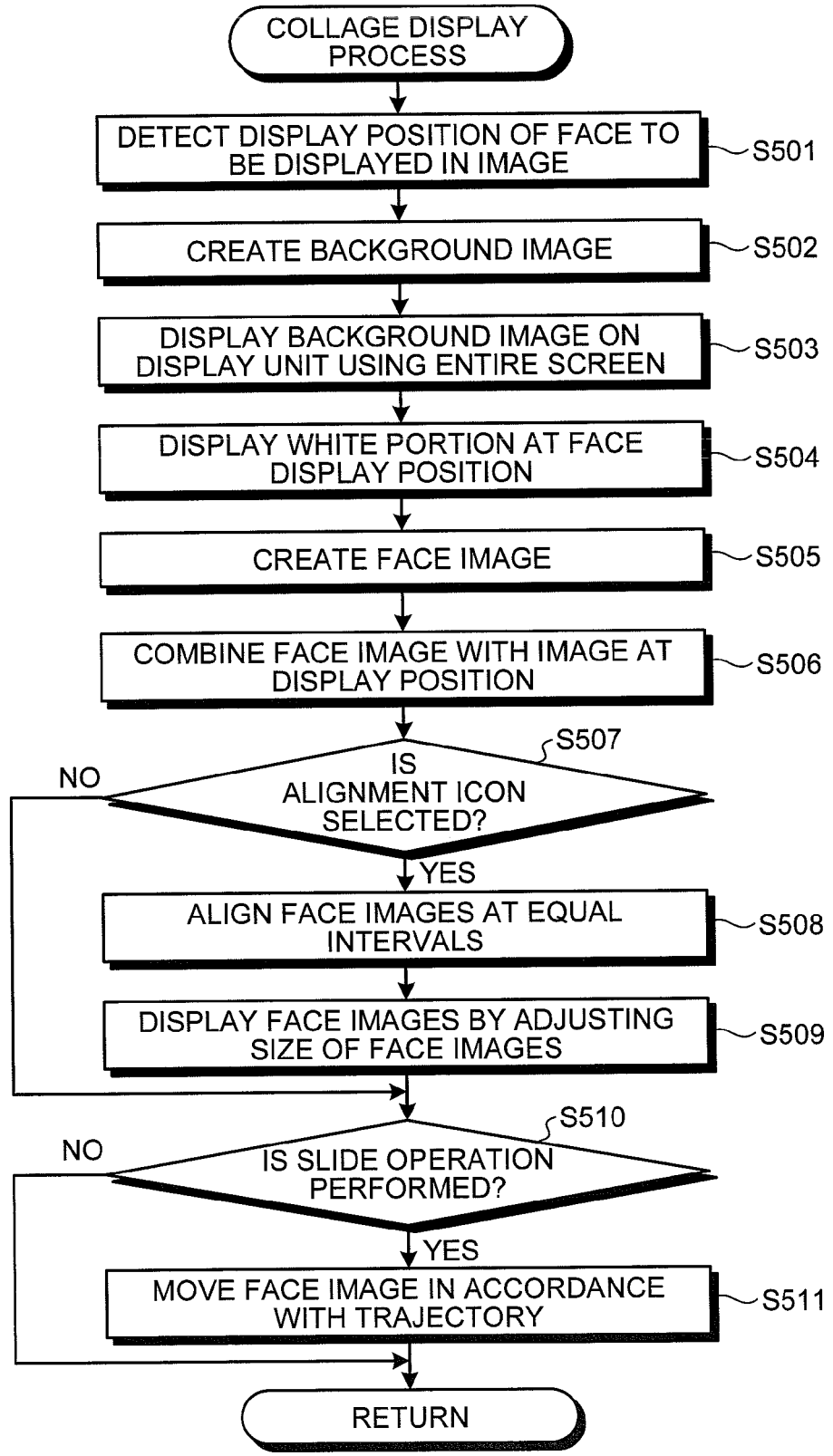
FIG. 20 is a flowchart illustrating the flow of a collage display process illustrated in FIG. 16.

In the following, the collage display process performed at Step S310 illustrated in FIG. 16 will be described. FIG. 20 is a flowchart illustrating the flow of the collage display process.

As illustrated in FIG. 20, the display position detector 94 detects a display position of a face including the face of the subject to be displayed in the live view image displayed by the display unit 6 (Step S501).

Subsequently, the trimming unit 93 creates a background image by cutting out, from the live view image, an area associated with the background frame displayed on the live view image by the display controller 96 (Step S502).

Then, the display controller 96 displays the background image created by the trimming unit 93 on the display unit 6 using the entire screen (Step S503) and displays an area on the display unit 6 by using a white portion having a solid white portion (Step S504). The area the display controller 96 displays has a predetermined size and has a display position (coordinate position) of the face of the subject to be displayed that is detected by the display position detector 94 and that is displayed at the center of the background image displayed by the display unit 6.

Subsequently, the trimming unit 93 creates a face image associated with a face area that has a part that includes the face detected by the face detector 92 (Step S505).

Figure 21:
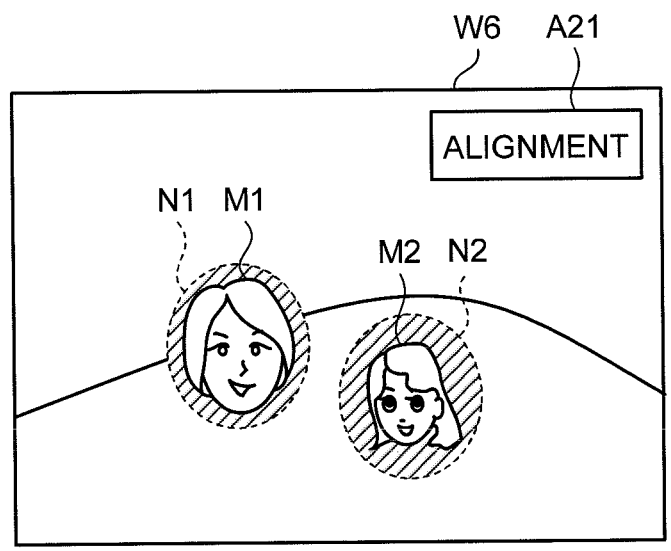
FIG. 21 is a schematic diagram illustrating an example of a composition image created by the image composition unit.

Thereafter, the display controller 96 displays, on the display unit 6, the composition image combined by the image composition unit 95 such that the face image created by the trimming unit 93 is combined with the background image at the display position indicated by a white portion (Step S506). Specifically, as illustrated in FIG. 21, the display controller 96 displays, on the display unit 6, a composition image W6 combined by the image composition unit 95 such that the face image M1 and the face image M2 are combined with the white portion N1 and the white portion N2, respectively, in the background image. At this time, the display controller 96 displays, on the display unit 6, an alignment icon A21 that receives an input of an instruction signal used to display, on the composition image W6, multiple face images by aligning the face images at equal intervals.

Subsequently, the control unit 101 determines whether the alignment icon A21 is touched (Step S507). Specifically, the control unit 101 determines whether the alignment icon A21 is touched in accordance with an instruction signal that is input, from the touch panel 7, due to the touch panel 7 being touched. If the control unit 101 determines that the alignment icon A21 is touched (Yes at Step S507), the imaging device 100 moves to Step S508, which will be described later. In contrast, if the control unit 101 determines that the alignment icon A21 is not touched within a predetermined length of time (e.g., 2 seconds) (No at Step S507), the imaging device 100 moves to Step S510, which will be described later.

Figure 22:
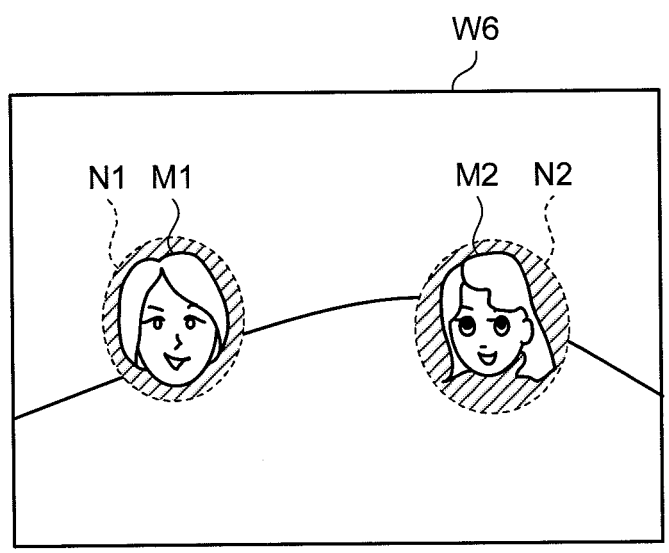
FIG. 22 is a schematic diagram illustrating an example of an image displayed by the display unit when an alignment icon is selected.

At Step S508, the display controller 96 aligns and displays, on the display unit 6, the multiple face images such that the face images are displayed at equal intervals in the background image and displays, on the display unit 6, the face images by adjusting the size of the face images to one of the face images (Step S509). For example, as illustrated in FIG. 22, if the number of face images is two, the display controller 96 arranges each of the face images such that they are equally arranged in a display area of the display unit 6. Specifically, the display controller 96 displays, in the display area of the display unit 6, each of the face images such that the display intervals in the vertical direction and the lateral direction are the same. Furthermore, the display controller 96 displays, on the display unit 6, the face images by enlarging the size of one face image (M2) so that it matches that of the other face image (M1).

Subsequently, in accordance with an instruction signal that is input from the touch panel 7, the control unit 101 determines whether a slide operation for moving the display position of the face image included in the composition image W6 displayed by the display unit 6 is performed (Step S510). If the control unit 101 determines that the slide operation for moving the display position of the face image included in the composition image W6 is performed (Yes at Step S510), the imaging device 100 moves to Step S511, which will be described later. In contrast, if the control unit 101 determines that the slide operation for moving the display position of the face image included in the composition image W6 is not performed within a predetermined length of time (3 seconds) (No at Step S510), the imaging device 100 returns to the collage mode process illustrated in FIG. 13.

At Step S511, in accordance with the trajectory of the slide operation performed by a user, the display controller 96 moves the display position of the face image and displays it on the display unit 6. Thereafter, the imaging device 100 returns to the collage mode process illustrated in FIG. 13.

According to the second embodiment of the present invention, the background detector 102 detects, as a background area from a live view image displayed by the display unit 6, an area that does not include the face of a subject to be displayed; the trimming unit 93 creates a background image and a face image by cutting out, from the live view image, a background area detected by the background detector 102 and a face area to be displayed selected by a user; the image composition unit 95 creates a composition image by combining a face image with a specified image in the background image; and the display controller 96 displays, on the display unit 6, the composition image created by the image composition unit 95. Accordingly, it is possible to capture an image in which only a specified person is captured from among multiple persons present during the capturing.

With the conventional technology, sometimes both a background and a person need to be captured in an unnatural composition of the picture by arranging the person in front of the background, such as a scene. However, with the imaging device (camera), because a background and a person are freely arranged, there is no need to take a long time to determine the composition of the picture by taking plenty of time, thus improving the simplicity of the capturing.

Third Embodiment

In the following, a third embodiment of the present invention will be described. An imaging device according to the third embodiment of the present invention includes, on its back surface side, a back-side imaging unit that captures a photographer. Furthermore, in the operation performed by the imaging device according to the third embodiment of the present invention, the collage mode process differs from that performed in the embodiments described above. Accordingly, in the following, after describing the configuration of the units that differ from those in the embodiments described above, the collage mode process performed by the imaging device according to the third embodiment of the present invention will be described. In the drawings, components that are identical to those in embodiments are assigned the same reference numerals.

Figure 23:
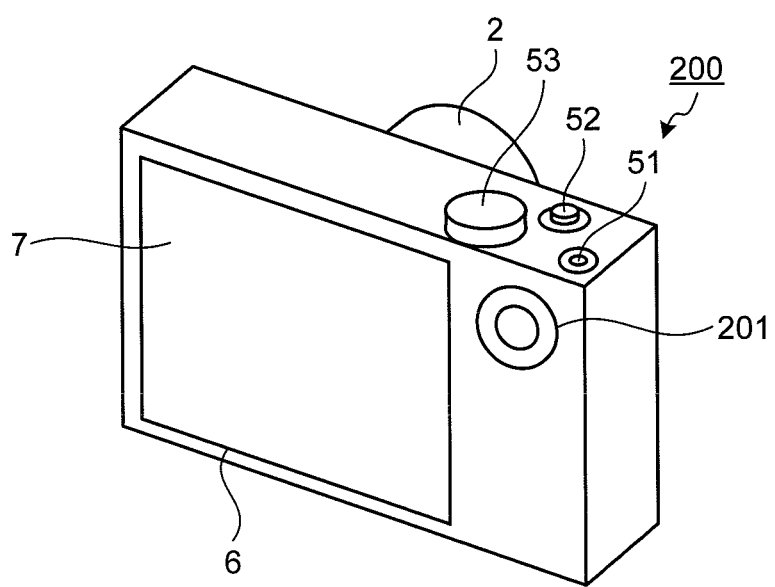
FIG. 23 is a perspective view illustrating the configuration of an imaging device, viewed from the side facing a photographer, according to a third embodiment of the present invention.
Figure 24:
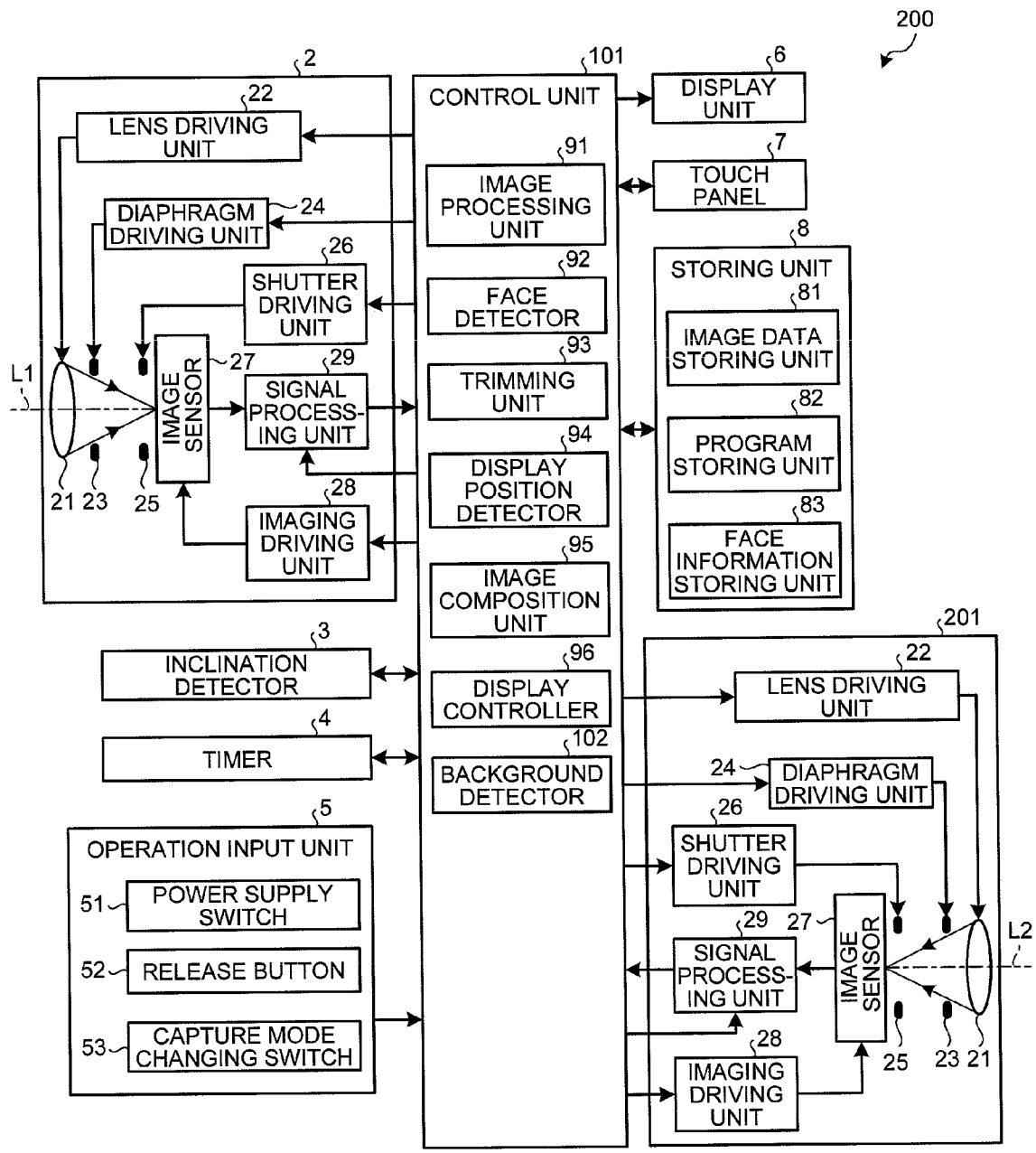
FIG. 24 is a block diagram illustrating the configuration of the imaging device according to the third embodiment of the present invention.

FIG. 23 is a perspective view illustrating the configuration of an imaging device 200, viewed from the side facing the photographer (back surface side), according to a third embodiment of the present invention. FIG. 24 is a block diagram illustrating the configuration of the imaging device 200 according to the third embodiment of the present invention.

As illustrated in FIGS. 23 and 24, the imaging device 200 further includes a back-side imaging unit 201. The back-side imaging unit 201 is implemented in the same configuration as the imaging unit 2 and includes the lens unit 21, the lens driving unit 22, the diaphragm 23, the diaphragm driving unit 24, the shutter 25, the shutter driving unit 26, the image sensor 27, the imaging driving unit 28, and the signal processing unit 29. The back-side imaging unit 201 collects light from a view area on the back surface side to perform photoelectric conversion, thus creating back-side image data.

Figure 25:
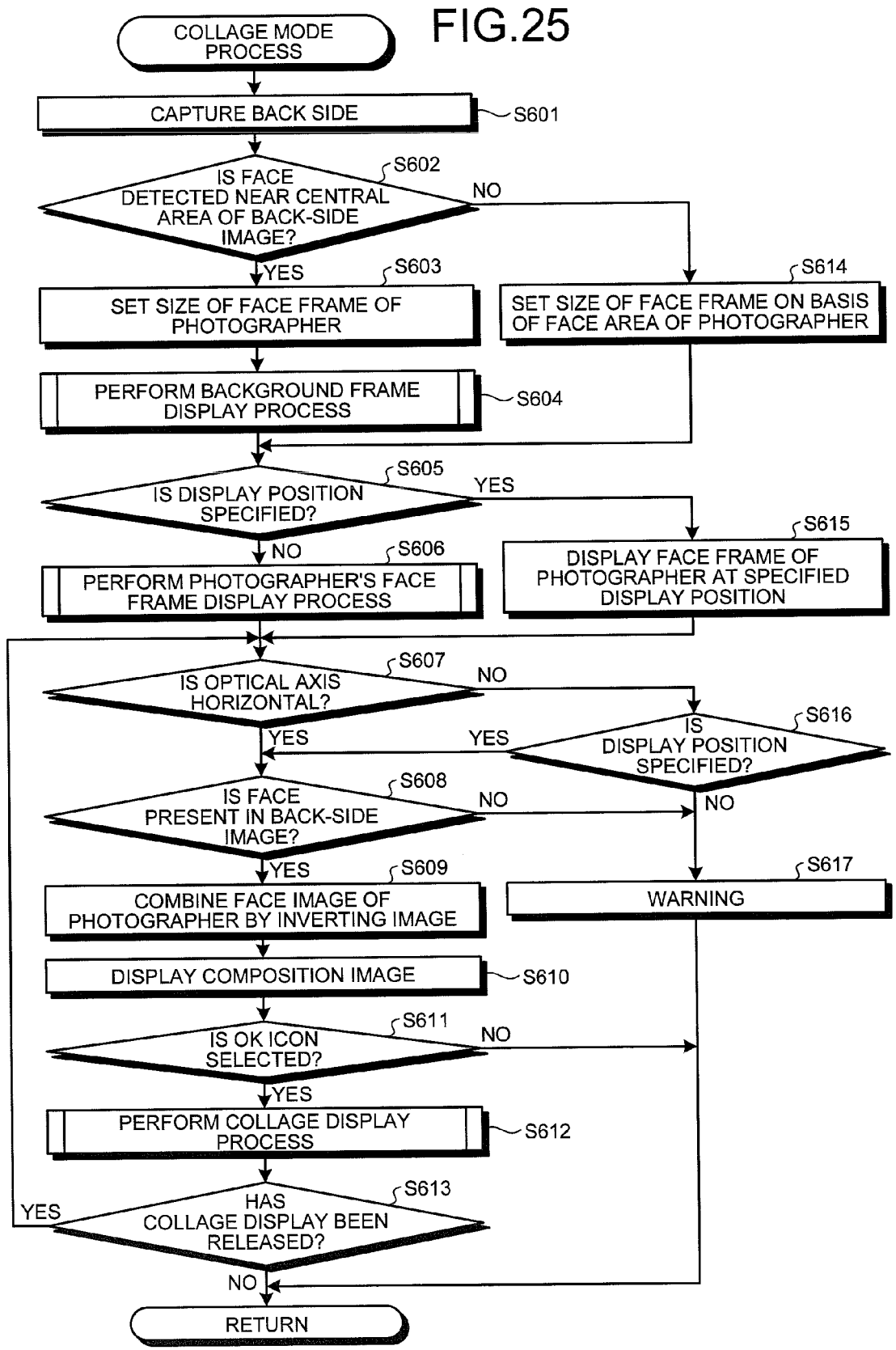
FIG. 25 is a flowchart illustrating the flow of a collage mode process performed by the imaging device according to the third embodiment of the present invention.

In the following, the collage mode process performed by the imaging device 200 according to the third embodiment will be described. FIG. 25 is a flowchart illustrating the flow of the collage mode process (Step S104 in FIG. 4) performed by the imaging device according to the third embodiment of the present invention.

In FIG. 25, under the control of the control unit 101, the imaging device 200 drives the back-side imaging unit 201, and thereby the imaging device 200 performs the capturing on the back side of the imaging device 200 (Step S601).

Figure 26:
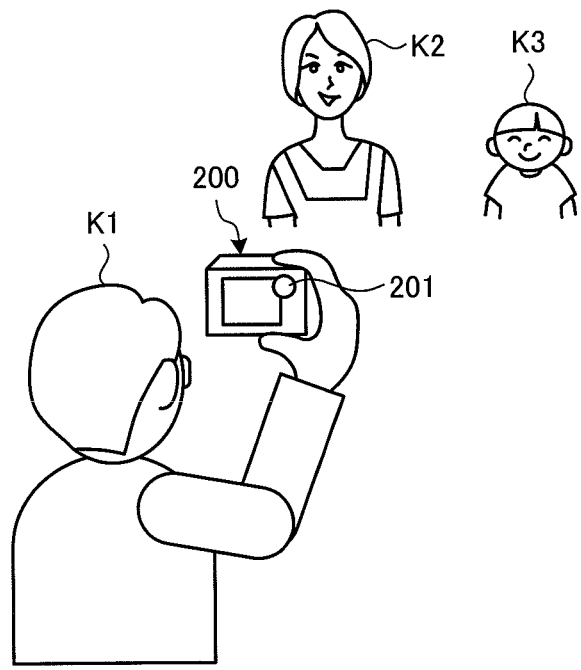
FIG. 26 is a schematic diagram illustrating a situation in which a photographer captures an image using the imaging device.
Figure 27:
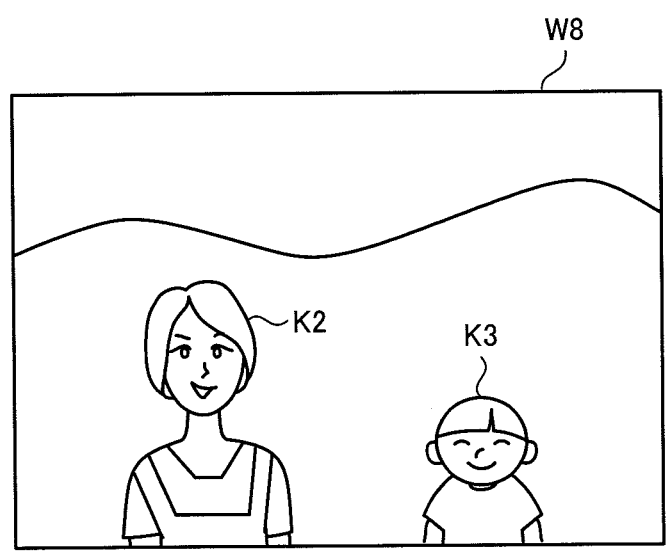
FIG. 27 is a schematic diagram illustrating a representative image from among live view images sequentially displayed in time series by the display unit when the situation is that illustrated in FIG. 26.

FIG. 26 is a schematic diagram illustrating a situation in which a photographer captures an image using the imaging device 200. FIG. 27 illustrates a representative image from among live view images sequentially displayed in time series by the display unit 6 when the situation is that illustrated in FIG. 26. As illustrated in FIGS. 26 and 27, a photographer K1 determines the composition of an image when capturing an image of, for example, a subject K2 (a mother) and a subject K3 (a child), while viewing a live view image W8, as illustrated in FIG. 27. Furthermore, the back-side imaging unit 201 captures an image on the back side including the photographer K1 (a father).

Subsequently, the control unit 101 determines whether the face detector 92 detects the face of the photographer corresponding to a subject near the central area of the back-side image (Step S602). If the control unit 101 determines that the face detector 92 detects the face of the photographer corresponding to the subject near the central area (front) of the back-side image (Yes at Step S602), the imaging device 200 moves to Step S603, which will be described later. In contrast, if the control unit 101 determines that the face detector 92 does not detect the face of the photographer corresponding to the subject near the central area of the back-side image (No at Step S602), the imaging device 200 moves to Step S614, which will be described later.

At Step S603, the control unit 101 sets the size of the face frame that has a part that includes the face of the photographer detected from the back-side image by the face detector 92. Specifically, the control unit 101 sets the size of the face frame associated with a face area that has a part that includes the face of the photographer detected from the back-side image by the face detector 92 to the size of the central area obtained when the back-side image is divided into nine areas.

Subsequently, the imaging device 200 performs the background frame display process (see FIG. 17) described above in which a background frame in a background image used as a background in the collage display is displayed on the live view image (Step S604).

Subsequently, the control unit 101 determines whether the display position for displaying the face of the photographer is specified (Step S605). If the control unit 101 determines that the display position for displaying the face of the photographer is specified (Yes at Step S605), the imaging device 200 moves to Step S615, which will be described later. In contrast, if the control unit 101 determines that the display position for displaying the face of the photographer is not specified (No at Step S605), the imaging device 200 moves to Step S606, which will be described later.

At Step S606, in accordance with the position of the photographer captured in the back-side image, the imaging device 200 performs a photographer's face frame display process for setting, on the live view image, the display position of the face frame of the photographer.

Figure 28:
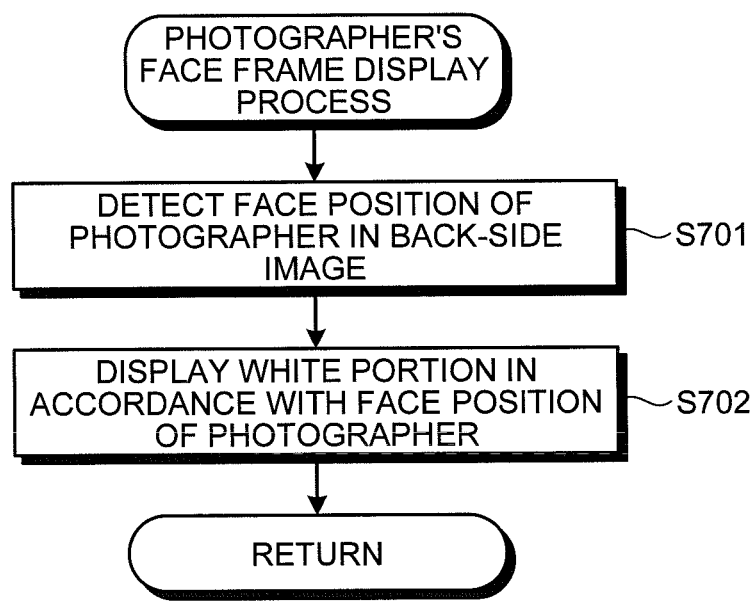
FIG. 28 is a flowchart illustrating the flow of a photographer's face frame display process illustrate in FIG. 25.

FIG. 28 is a flowchart illustrating the flow of the photographer's face frame display process performed at Step S606 illustrated in FIG. 25.

As illustrated in FIG. 28, the display position detector 94 detects the position of the face of the photographer in the background image (Step S701).

Subsequently, in accordance with the position of the face of the photographer in the back-side image detected by the display position detector 94, the display controller 96 displays a white portion on the live view image displayed by the display unit 6 (Step S702). Thereafter, the imaging device 200 returns to the collage mode process illustrated in FIG. 25.

Figure 29A:
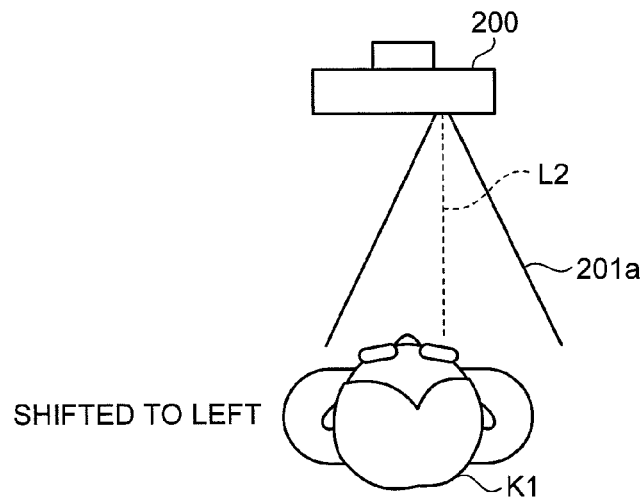
FIGS. 29A to 29D are schematic diagrams illustrating a display method performed when a display controller displays a face image of a photographer on a white portion of a live view image.
Figure 29B:
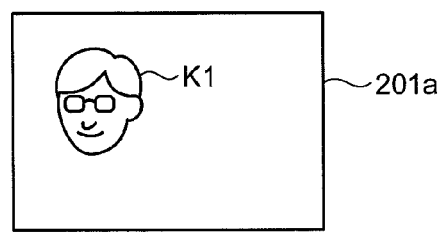
Figure 29C:
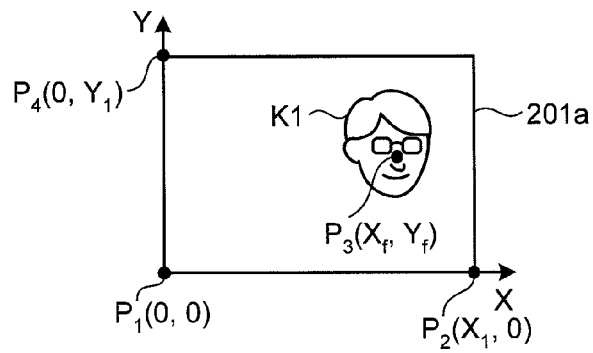

FIGS. 29A to 29D are schematic diagrams illustrating a display method performed when the display controller 96 displays a face image of a photographer on a white portion of a live view image. FIG. 29A illustrates the situation in which the photographer is positioned shifted to the left from an optical axis L2 of the back-side imaging unit 201. FIGS. 30A to 30D are schematic diagrams illustrating the display method performed when the display controller 96 displays a face image of a photographer on a white portion of a live view image. FIG. 30A illustrates the situation in which the photographer is positioned shifted to the right from the optical axis L2 of the back-side imaging unit 201. In FIGS. 29A to 29D and 30A to 30D, the capturing area of the back-side imaging unit 201 is denoted by 201a.

Figure 29D:
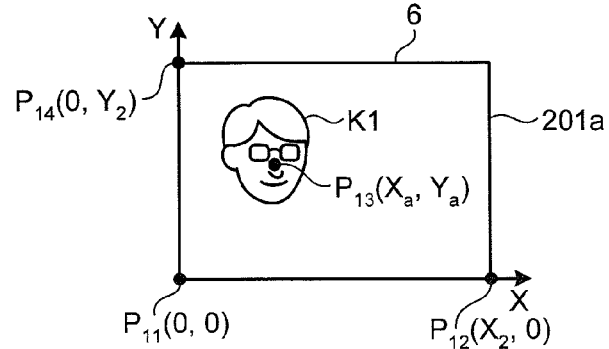
Figure 30A:
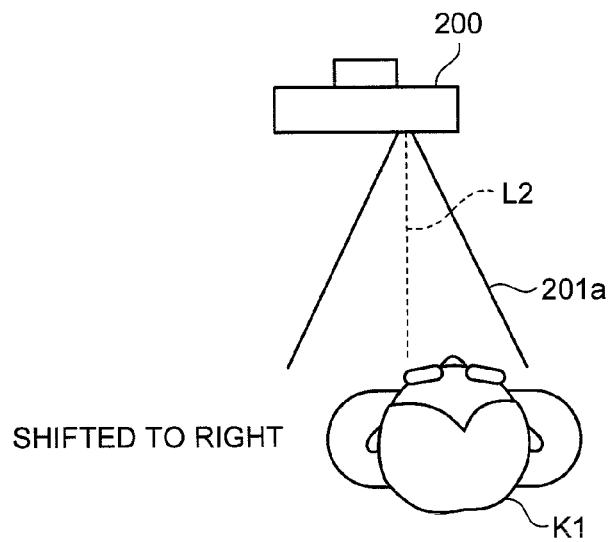
FIGS. 30A to 30D are schematic diagrams illustrating a display method performed when the display controller displays a face image of a photographer on a white portion of a live view image.
Figure 30B:
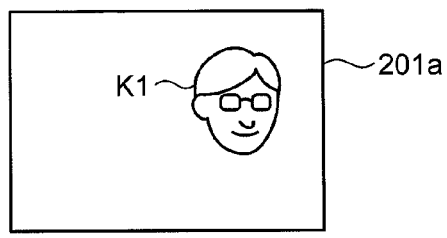
Figure 30C:
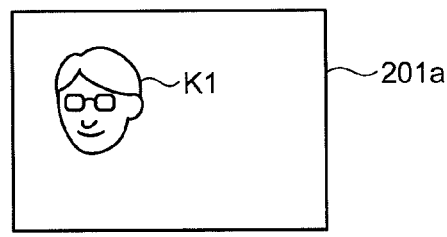
Figure 30D:
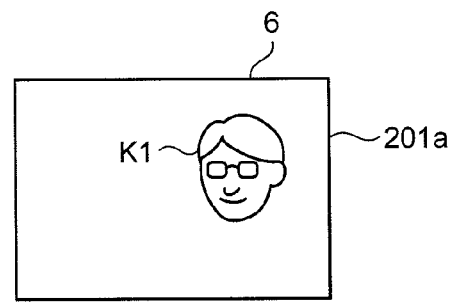
Figure 31A:
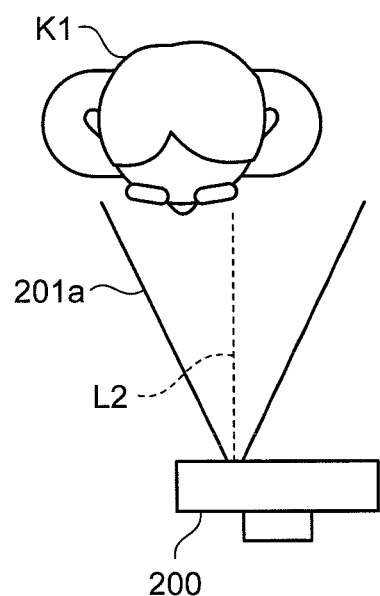
FIGS. 31A and 31B are schematic diagrams illustrating the positional relationship between a photographer and an image in which the photographer is imaged.
Figure 31B:
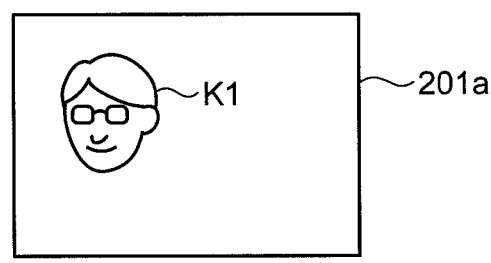
Figure 32:
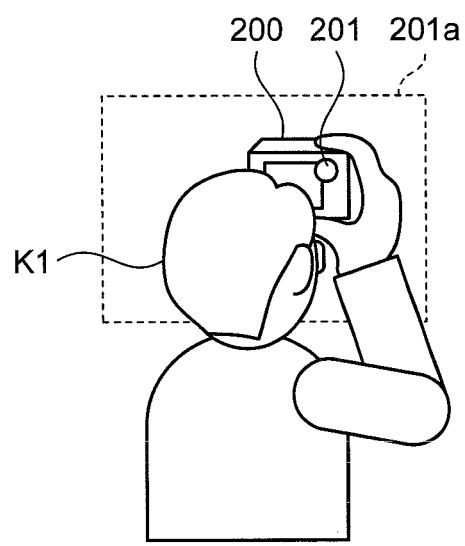
FIG. 32 is a schematic diagram illustrating a situation in which a photographer adjusts the position of a face frame of the photographer while viewing a live view image displayed by the display unit.
Figure 33:
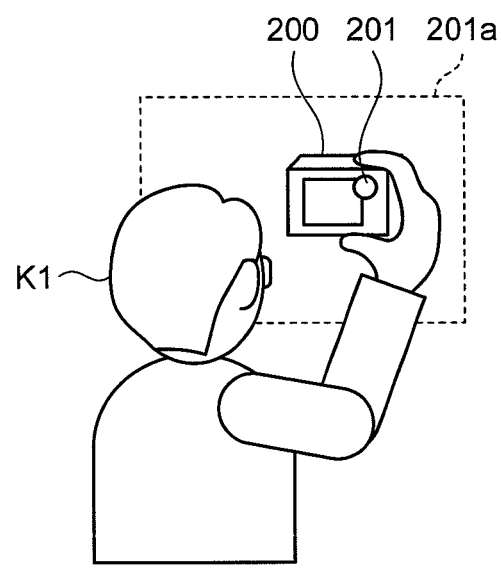
FIG. 33 is a schematic diagram illustrating a situation in which a photographer adjusts the position of his/her own face frame while viewing a live view image displayed by the display unit.

As illustrated in FIG. 29D and FIG. 30D, in the third embodiment, the display controller 96 displays, on the display unit 6, a white portion at the position of the live view image associated with the position of the photographer captured in the back-side image 201a and displays, on the display unit 6, and the face image of the photographer that is to be combined with the white portion by inverting the face image (FIG. 29D and FIG. 30D). Accordingly, as illustrated in FIGS. 32 and 33, by adjusting the position of the imaging device 200 while viewing the white portion of the live view image, the photographer can adjust the position of the photographer to be captured himself/herself. In contrast, as illustrated in FIG. 29A and FIG. 30A, with the conventional imaging device, if an image captured by the back-side imaging unit 201 is displayed on the display unit 6, in order for the photographer K1 to easily recognizing the captured image, the image is displayed by inverting (coordinate transformation) the position of the photographer K1 such that the photographer K1 is represented, like a mirror image, at the position in the image that is captured by the imaging unit 2 arranged on the front side (FIG. 29B→FIG. 29C and FIG. 30B→FIG. 30C). Furthermore, as illustrated in FIGS. 31A to 31B, even if the face image of the photographer is simply combined with the image captured from the front side in accordance with the position of the face of the photographer imaged in the back-side image, the left- and right-side face of the photographer are inverted (FIG. 31B. Accordingly, when combining the face image of the photographer with the image captured by the imaging unit 2 arranged on the front side, the images are sometimes unnaturally combined.

In the following, a description will be given of the position of a white portion on the live view image displayed on the display unit 6 by the display controller 96. Specifically, in FIG. 29C, it is assumed that there is a coordinate system with the lower left of the back-side image 201a as the origin $P_1$, with the lateral direction of the back-side image 201a as the X-axis, and with the vertical direction of the back-side image 201a as the Y-axis. Furthermore, in FIG. 29D, it is assumed that there is a coordinate system with the lower left of the display unit 6 as the origin $P_{11}$, with the lateral direction of the display unit 6 as the X-axis, and with the vertical direction of the display unit 6 as the Y-axis.

As illustrated in FIG. 29C and FIG. 29D, if the coordinates of a point $P_2$ at the lower right of the back-side image 201a are represented by $(X_1, 0)$, the coordinates of a point $P_3$ of the photographer K1 in the back-side image 201a are represented by $(X_f, Y_f)$, the coordinates of a point $P_{12}$ at the lower right of the display unit 6 are represented by $(X_2, 0)$, and the coordinates of a point $P_{13}$ of the photographer K1 on the display unit 6 are represented by $(X_a, Y_a)$, the display controller 96 calculates the coordinates of a point $P_{13}$ of the photographer K1 on the display unit 6 using Equation (1) given below:

$$X_a : X_2 = X_1 - X_f : X_1 \qquad (1)$$

Accordingly, Equation (2) below is obtained.

$$X_a = (X_1 - X_f) X_2 / X_1 \qquad (2)$$

Similarly, if the coordinates of a point $P_4$ at the upper left of the back-side image 201a are represented by $(0, Y_1)$ and the coordinates of a point $P_{14}$ at the upper left of the display unit 6 are represented by $(0, Y_2)$, Equation (3) below is given:

$$Y_a : Y_2 = Y_f : Y_1 \qquad (3)$$

Accordingly, Equation (4) below is obtained.

$$Y_a = Y_2 Y_f / Y_1 \quad (4)$$

In this way, by using Equations (2) and (4), the display controller 96 calculates the coordinates of the photographer K1 on the display unit 6 and displays, as a white portion on the live view image displayed by the display unit 6, the area that has a part that includes the calculated coordinates. Furthermore, the display controller 96 may also simply display the white portion on the live view image displayed on the display unit 6 without performing the coordinate transformation or the like in accordance with the position of the face of the photographer on the back-side image 201a.

By referring back to FIG. 25, a description will be given of the processes performed at Step S607 and the subsequent processes. At Step S607, on the basis of the detection results of the inclination detector 3, the control unit 101 determines whether the optical axis L2 of the imaging device 1 is horizontal. If an optical axis L1 and the optical axis L2 of the imaging device 200 are horizontal (Yes at Step S607), the imaging device 200 moves to Step S608, which will be described later. In contrast, if neither the optical axis L1 nor the optical axis L2 of the imaging device 200 are horizontal (No at Step S607), the imaging device 200 moves to Step S616, which will be described later.

Figure 34:
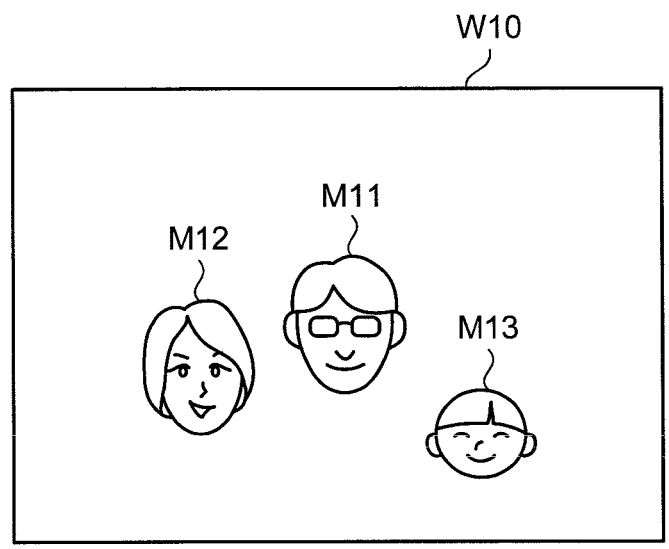
FIG. 34 is a schematic diagram illustrating an example of an image that is ideal in a collage mode.
Figure 35:
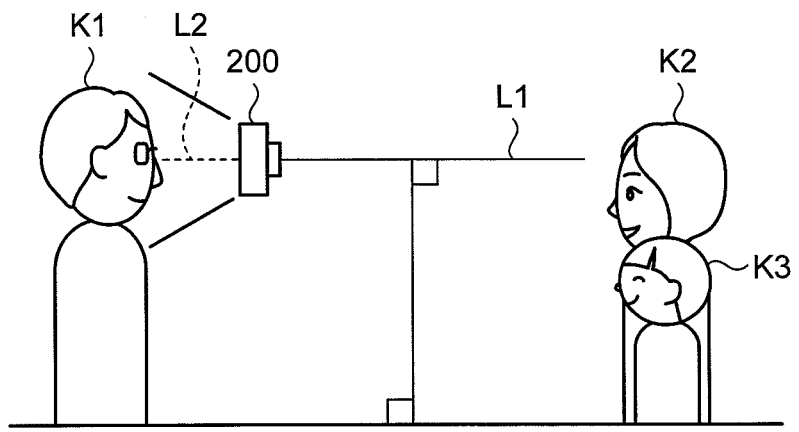
FIG. 35 is a schematic diagram illustrating the positional relationship among the photographer, subjects, and imaging device.

In the following, the reason for determining the horizontal state will be described. As illustrated in FIG. 34, when the face image M11 of the photographer is combined, the position of the face image M11 of the photographer is preferably combined by considering the relationship between the height of the face acquired by the back-side imaging unit 201 and the height of the face of the subject displayed on the imaging unit 2. For example, an image is unnatural if the display position of the face of the subject (a father) K1 corresponding to the photographer is lower than that of the subject K3 (a child). Accordingly, as illustrated in FIG. 35, on the basis of the detection results of the inclination detector 3, the control unit 101 determines whether the optical axes L1 and L2 of the imaging device 200 are horizontal.

At Step S608, the control unit 101 determines whether the face detector 92 detects the face of the photographer from a back-side image. If the control unit 101 determines that the face detector 92 detects the face of the photographer from a back-side image (Yes at Step S608), the imaging device 200 moves to Step S609, which will be described later. In contrast, if the control unit 101 determines that the face detector 92 does not detect the face of the photographer from a back-side image (No at Step S608), the imaging device 200 moves to Step S617, which will be described later.

At Step S609, the image composition unit 95 inverts the left- and right-side of the face image of the photographer created by the trimming unit 93 and combines the face image with the live view image on the white portion, thus creating a composition image.

Subsequently, the display controller 96 displays, on the display unit 6, the composition image created by the image composition unit 95 by inverting the left and the right of the face image of the photographer and by combining the face image with the white portion of the live view image (Step S610).

Figure 36:
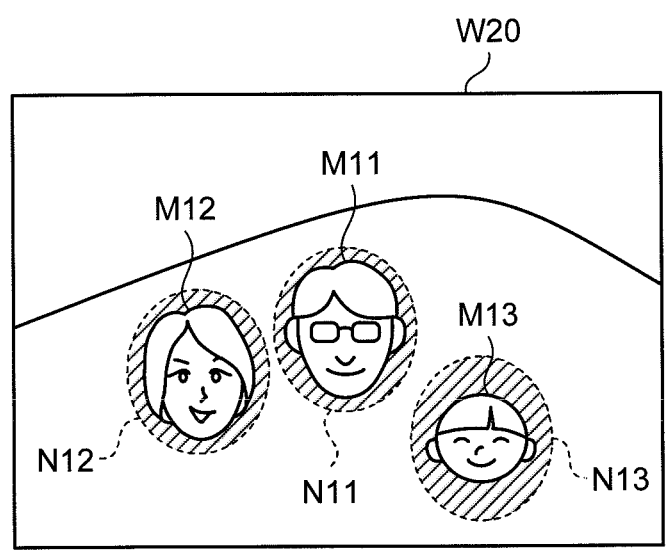
FIG. 36 is a schematic diagram illustrating an example of an image displayed in a collage display process performed by the imaging device according to the third embodiment of the present invention.

Subsequently, in accordance with an instruction signal that is input from the touch panel 7, the control unit 101 determines whether the OK icon A12 is selected (Step S611). If the control unit 101 determines that the OK icon A12 is selected (Yes at Step S611), the imaging device 200 performs the collage display process (see FIG. 20) described above (Step S612). At this time, as illustrated in FIG. 36, the display controller 96 displays, on the display unit 6, an image W20 subjected to the collage display process. Accordingly, when a family photograph is taken, it is possible to take the family photograph in which the face image M11 of the father is captured together with the face images M12 and M13 of the mother and the child, which makes it possible to share the memory at the time of capturing when the photograph is printed.

Then, in accordance with an instruction signal that is input from the touch panel 7, the control unit 101 determines whether a collage display release icon (not shown) is selected (Step S613). If the control unit 101 determines that the collage display release icon is selected (Yes at Step S613), the imaging device 200 returns to Step S607. In contrast, if the collage display release icon is not selected within a predetermined length of time (e.g., 2 seconds) (No at Step S613), the imaging device 200 returns to the main routine illustrated in FIG. 4.

At Step S611, if the control unit 101 determines that the OK icon A12 is not selected within a predetermined length of time (e.g., 3 seconds) (No at Step S611), the imaging device 200 returns to the main routine illustrated in FIG. 4.

At Step S614, on the basis of the face area of the photographer detected from the back-side image by the face detector 92, the control unit 101 sets the size of the face frame displayed on the live view image by the display unit 6. Then, the imaging device 200 moves to Step S605.

At Step S615, the display controller 96 displays the face frame of the photographer at the display position, which is previously specified by a user, on the live view image displayed by the display unit 6. Then, the imaging device 200 moves to Step S607.

At Step S616, the control unit 101 determines whether the display position of the face frame of the photographer is specified on the live view image displayed by the display unit 6. If the control unit 101 determines that the display position of the face frame of the photographer is specified (Yes at Step S616), the imaging device 200 moves to Step S608. In contrast, if the control unit 101 determines that the display position of the face frame of the photographer is not specified (No at Step S616), the imaging device 200 moves to Step S617.

At Step S617, the display controller 96 displays, on the display unit 6, a warning indicating that the face of the photographer cannot be combined. Then, the imaging device 200 returns to the main routine illustrated in FIG. 4.

According to the third embodiment of the present invention described above, the back-side imaging unit 201 that captures a photographer is arranged; the face image of the photographer imaged on the back-side image created by the back-side imaging unit 201 is combined with the image created by the imaging unit 2; and the composition image is displayed on the display unit 6. Accordingly, if the photographer is not included in the composition of the image captured, the photographer is virtually included. Accordingly, it is possible to capture an image, such as a family image, with which the memory at the time of the capturing is shared.

Furthermore, in the third embodiment described above, the back-side imaging unit 201 is arranged on the back side of the imaging device 200. However, for example, the back-side imaging unit 201 may also be arranged on the side face of the imaging device 200.

Furthermore, in the third embodiment described above, the imaging unit 2 and the back-side imaging unit 201 are arranged on the front side and the back side of the imaging device 200, respectively. However, each of the imaging units may also be arranged on each of the both sides of the imaging device 200.

Another Embodiment

Furthermore, in the third embodiment described above, a description has been given of a case in which the imaging device is a digital camera. However, the imaging device may also be used with an electronic device, such as a digital single-lens reflex camera, a digital video camera, or with a mobile phone or a tablet mobile device having two capturing functions.

Furthermore, in the present invention, for an image obtained by combining a captured face with a face image, it is possible to use images that are continuously imaged on the different capturing conditions, for example, different exposure conditions or different capturing scenes.

Furthermore, in the present invention, the image composition unit may also determine the face area that includes the face of a subject detected by the face detector at the time of capturing and, in accordance with the determination results, combine, at an area other than the face area, the image with another image, for example, a face image or an icon.

Furthermore, the present invention may also be used in a capturing system, such as a fisheye lens or a 360-degree capturing. Desired backgrounds and the relationship between the layout and the size of the faces may also be stored in a database or stored as equations, and then, on the basis of the stored data, images may also be combined by automatically performing the layout.

In the embodiments described above, a description has been given of a case in which a single image is captured in a single capturing; however, of course, multiple layout images may also be stored. Furthermore, the background capturing and the person capturing may also be separately performed. Furthermore, optimum images may also be combined by performing the focus adjustment or the exposure adjustment each time. If two or more persons are present, a capturing parameter, such as focus, exposure, and zoom, may also be changed. Multiple capturing may also be performed without haste by changing the size or the expression of the face for each person. Of course, the multiple capturing may also be continuously performed using point and shoot, without any effort, which makes it possible to implement free-style image expressions.

In a description of the flowcharts in the embodiments described above, the context is stated by using "first", "then", "subsequently", and the like when describing the processes performed at each Step; however, the order of the processes required for implementing the present invention is not uniquely determined by the descriptions above. Specifically, the order of the processes in the flowchart described in the embodiments may also be changed as long as processes do not contradict. Furthermore, the processes may also be simultaneously (in parallel) performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    an imaging unit that images a subject and that continuously creates image data on the subject;
    a face detector that detects a face of the subject included in the image data;
    a background area detector that (1) divides the image into a plurality of predetermined areas, (2) determines, for each of the plurality of predetermined areas, whether or not the face of the subject detected by the face detector is present within the predetermined area, and (3) defines one of the predetermined areas determined not to have the face of the subject present as a selected background area;
    a trimming unit that (1) creates a face image by cutting out, from an image, a face area that includes the face of the subject detected by the face detector, and (2) enlarges the selected background area to generate a background image;
    an image composition unit that creates a collage image by combining the face image with the background image; and
    a display controller that displays the collage image.

2. The imaging device according to claim 1, further comprising a display position detector that detects a display position, in the image, of the face of the subject detected by the face detector, wherein the display controller displays the face image in the display area associated with the display position detected by the display position detector.

3. The imaging device according to claim 2, wherein capturing of the face and the background image with which the face image is combined are continuously imaged by the imaging unit under different capturing conditions.

4. The imaging device according to claim 3, wherein the capturing of the face also includes a photographer side.

5. The imaging device according to claim 1, wherein the background area detector divides the image into a predetermined number of predetermined areas.

6. The imaging device according to claim 5, wherein the predetermined number of predetermined areas is at least nine.

7. The imaging device according to claim 2, further comprising an input unit that receives an input of an instruction signal for moving, in the display area, the display position of the face image displayed by the display unit, wherein the display controller moves the face image in accordance with the instruction signal received by the input unit and displays the face image on the display unit.

8. The imaging device according to claim 7, wherein
    the input unit can further receive an input of a change instruction signal for giving an instruction to change the size of the face image, and
    the display controller changes the size of the face image in accordance with the change instruction signal received by the input unit and displays the face image on the display unit.

9. The imaging device according to claim 8, wherein
    the face detector can detect multiple faces of subjects included in the image, and
    the input unit can further receive an input of a selection signal for selecting a face to be displayed from among the multiple faces detected by the face detector.

10. The imaging device according to claim 9, further comprising a second imaging unit that is arranged at a position different from a position in which the imaging unit is arranged and that creates second image data by performing photoelectric conversion by collecting light from a predetermined view area, wherein
    the face detector detects a face of a subject included in a second image associated with the second image data,
    the trimming unit creates a second face image by cutting out, from the second image, a face area that includes the face detected from the second image by the face detector, and
    the image composition unit combines the second face image with the selected background image.

11. The imaging device according to claim 10, wherein the image composition unit inverts the display position of the second face image and combines the second face image with the selected background image.

12. The imaging device according to claim 11, further comprising an inclination detector that detects the inclination of the imaging device, wherein the image composition unit combines the second face image with the selected background image in accordance with a detection result of the inclination detector.

13. The imaging device according to claim 12, wherein the display controller displays the display area associated with the display position detected by the display position detector in a display state in which the display area can be identified.

14. A display method for executing, at the time of capturing, by an imaging device that includes an imaging unit, which images a subject and continuously creates image data on the subject, and that includes a display unit, which chronologically displays images associated with the image data created by the imaging unit, the display method comprising:
   detecting a face of the subject included in an image;
   dividing the image into a plurality of predetermined areas;
   determining, for each of the plurality of predetermined areas, whether or not the face of the subject detected by the face detector is present within the predetermined area;
   defining of the predetermined areas determined not to have the face of the subject present as a selected background area;
   creating a face image by cutting out, from the image, a face area including the subject and trimming the cut out face area;
   enlarging the selected background area to generate a background image;
   combining the face image with the background image to create a collage image; and
   displaying the collage image.

15. The display method according to claim 14, wherein the background area detector divides the image into a predetermined number of predetermined areas.

16. The display method according to claim 15, wherein the predetermined number of predetermined areas is at least nine.

17. A non-transitory computer-readable storage medium with an executable program stored thereon, wherein the program instructs a processor included in an imaging device, which includes an imaging unit that images a subject and that continuously creates image data on the subject and includes a display unit that chronologically displays images associated with the image data created by the imaging unit, to perform:
   detecting a face of the subject included in an image;
   dividing the image into a plurality of predetermined areas;
   determining, for each of the plurality of predetermined areas, whether or not the face of the subject detected by the face detector is present within the predetermined area;
   defining of the predetermined areas determined not to have the face of the subject present as a selected background area;
   creating a face image by cutting out, from the image, a face area including the subject and trimming the cut out face area;
   enlarging the selected background area to generate a background image;
   combining the face image with the background image to create a collage image; and
   displaying the collage image.

18. The non-transitory computer-readable storage medium according to claim 17, wherein the background area detector divides the image into a predetermined number of predetermined areas.

19. The non-transitory computer-readable storage medium according to claim 18, wherein the predetermined number of predetermined areas is at least nine.

* * * * *